United States Patent
Koshimizu et al.

(10) Patent No.: US 9,740,317 B2
(45) Date of Patent: Aug. 22, 2017

(54) TOUCH SENSOR AND PRODUCTION METHOD FOR SAME

(71) Applicant: FUJIKURA LTD., Tokyo (JP)

(72) Inventors: Kazutoshi Koshimizu, Sakura (JP); Shinsuke Aoshima, Sakura (JP); Yusuke Iguchi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 167 days.

(21) Appl. No.: 14/771,379

(22) PCT Filed: Mar. 28, 2014

(86) PCT No.: PCT/JP2014/059175
§ 371 (c)(1),
(2) Date: Aug. 28, 2015

(87) PCT Pub. No.: WO2014/157632
PCT Pub. Date: Oct. 2, 2014

(65) Prior Publication Data
US 2016/0011683 A1    Jan. 14, 2016

(30) Foreign Application Priority Data

Mar. 28, 2013  (JP) ................... 2013-068594
Mar. 28, 2013  (JP) ................... 2013-068596

(51) Int. Cl.
*G06F 3/041*   (2006.01)
*G06F 1/16*    (2006.01)

(52) U.S. Cl.
CPC ............ *G06F 3/041* (2013.01); *G06F 1/16* (2013.01); *G06F 2203/04103* (2013.01); *G06F 2203/04112* (2013.01)

(58) Field of Classification Search
CPC ........................................ G06F 3/041
See application file for complete search history.

(56) References Cited

U.S. PATENT DOCUMENTS 8,963,014 B2    2/2015   Hwang et al.
2004/0239650 A1*  12/2004  Mackey ................. G06F 3/044
                                                         345/174

(Continued)

FOREIGN PATENT DOCUMENTS

CN    102725719 A    10/2012
CN    202649958 U     1/2013

(Continued)

OTHER PUBLICATIONS

Extended European Search Report for PCT/JP2014/059175 dated Sep. 28, 2016.

(Continued)

*Primary Examiner* — Vijay Shankar
*Assistant Examiner* — Cory Almeida
(74) *Attorney, Agent, or Firm* — Sughrue Mion, PLLC

(57) ABSTRACT

A touch sensor (2) includes: a substrate (21); a net-shaped electrode (22) which is provided on the substrate (21) and includes conductive wires (221) arranged in a net form; and an outer edge wire (23) which is provided in at least a part of an outer edge of the net-shaped electrode (22) and is integrally formed with the net-shaped electrode. The conductive wire (221) includes a large-width portion which is provided in at least one of lateral parts of a connection portion and gradually widens according to approaching the outer edge wire (23), and the connection portion is a portion of the conductive wire (221) which is connected to the outer edge wire (23). Expressions (1) and (2) are satisfied:

$$A \leq 100 \ [\mu m] \quad (1)$$

$$B/A \geq \tfrac{1}{2} \quad (2).$$

(Continued)

In Expressions (1) and (2), "A" is a width of the outer edge wire (23), and "B" is a largest width of the conductive wires (221) in a portion where the large-width portion (222) is provided.

10 Claims, 19 Drawing Sheets

(56) References Cited

U.S. PATENT DOCUMENTS

| | | |
|---|---|---|
| 2008/0230259 A1 | 9/2008 | Booth, Jr. et al. |
| 2009/0160783 A1* | 6/2009 | Yang .................. G06F 3/044 345/173 |
| 2011/0096005 A1* | 4/2011 | Kim .................... G06F 3/044 345/173 |
| 2012/0125677 A1 | 5/2012 | Choi et al. |
| 2012/0312677 A1 | 12/2012 | Kuriki |
| 2013/0127739 A1 | 5/2013 | Guard et al. |
| 2013/0127771 A1 | 5/2013 | Carley et al. |
| 2013/0127772 A1 | 5/2013 | Guard et al. |
| 2013/0127775 A1 | 5/2013 | Yilmaz et al. |
| 2013/0127776 A1 | 5/2013 | Guard et al. |
| 2013/0342504 A1 | 12/2013 | Hwang et al. |
| 2014/0192277 A1 | 7/2014 | Yilmaz et al. |
| 2014/0198270 A1 | 7/2014 | Hwang et al. |
| 2014/0226089 A1 | 8/2014 | Guard et al. |
| 2015/0021584 A1 | 1/2015 | Guard et al. |
| 2015/0068884 A1 | 3/2015 | Kuriki |
| 2015/0109246 A1 | 4/2015 | Lee et al. |

FOREIGN PATENT DOCUMENTS

| | | |
|---|---|---|
| CN | 103002664 A | 3/2013 |
| CN | 103814347 A | 5/2014 |
| DE | 20 2012 102 384 U1 | 7/2012 |
| EP | 2 796 967 A1 | 10/2014 |
| EP | 2 871 558 A2 | 5/2015 |
| JP | 2001-358496 A | 12/2001 |
| JP | 2009-200333 A | 9/2009 |
| JP | 2009-302090 A | 12/2009 |
| JP | 2010-257350 A | 11/2010 |
| WO | 2013/011788 A1 | 1/2013 |

OTHER PUBLICATIONS

International Search Report for PCT/JP2014/059175 dated Jun. 10, 2014.

Communication dated Mar. 2, 2017, issued by the State Intellectual Property Office of the P.R.C. in corresponding Chinese Application No. 201480011224.0.

* cited by examiner

TOUCH SENSOR AND PRODUCTION METHOD FOR SAME

CROSS REFERENCE TO RELATED APPLICATIONS

This application is a National Stage of International Application No. PCT/JP2014/059175 filed Mar. 28, 2014, claiming priority based on Japanese Patent Application No. 2013-068594, filed Mar. 28, 2013, the contents of all of which are incorporated herein by reference in their entirety.

TECHNICAL FIELD

The present invention relates to a touch sensor used in a touch panel or a touch key and a production method for the same.

BACKGROUND ART

An electrode film for touch panels in which a conductive composition including conductive powder of gold, silver, or the like is printed on an electrode film by being transferred from an intaglio so as to form a conductive mesh on the electrode film is known (for example, see Patent Document 1).

CITATION LIST

Patent Document

Patent Document 1: JP 2010-257350 A

DISCLOSURE OF THE INVENTION

Problem to be Solved by the Invention

When the outer edge wire which is formed on the outer edge of the conductive mesh is printed and formed simultaneously with printing of the conductive mesh, there is a problem in that, if the conductive composition is not appropriately filled in the intaglio, disconnections may occur between the conductive mesh and the outer edge wire.

An object of the invention is to provide a touch sensor and a production method for the same which is capable of suppressing disconnections between a net-shaped electrode and an outer edge wire which are printed simultaneously.

Means for Solving Problem

[1] A touch sensor according to the invention is a touch sensor including: a substrate; a net-shaped electrode which is provided on the substrate and includes conductive wires arranged in a net form; and an outer edge wire which is provided in at least a part of an outer edge of the net-shaped electrode and is integrally formed with the net-shaped electrode, wherein the conductive wire includes a large-width portion which is provided in at least one of lateral parts of a connection portion and gradually widens according to approaching the outer edge wire, the connection portion being a portion of the conductive wire which is connected to the outer edge wire, and Expressions (1) and (2) are satisfied:

$$A \leq 100 \, [\mu m] \quad (1)$$

$$B/A \geq \frac{1}{2} \quad (2)$$

in Expressions (1) and (2), "A" is a width of the outer edge wire, and "B" is a largest width of the conductive wire in a portion where the large-width portion is provided.

[2] In the above invention, Expression (3) may be satisfied:

$$C/A \geq \frac{1}{20} \quad (3)$$

in Expression (3), "C" is a width of the conductive wire excluding the large-width portion.

[3] A production method for a touch sensor according to the invention is a production method for a touch sensor, including: a first step of filling a conductive paste in a recess pattern formed in a intaglio and moving a doctor blade so as to slide with respect to the intaglio; and a second step of transferring the conductive paste to a transfer object, wherein the recess pattern includes: a net-shaped recess which includes linear recesses arranged in a net form; and an outer edge recess which is provided to be continuous to at least a part of an outer edge of the net-shaped recess, the linear recess includes a large-width recess which is provided in at least one of lateral parts of a connection portion gradually widens according to approaching the outer edge recess, the connection portion being a portion of the linear recess which is connected to the outer edge recess and, and Expressions (4) and (5) are satisfied:

$$a \leq 100 \, [\mu m] \quad (4)$$

$$b/a \geq \frac{1}{2} \quad (5)$$

in Expressions (4) and (5), "a" is a width of the outer edge recess, and "b" is a largest width of the linear recess in a portion where the large-width recess is provided.

[4] In the above invention, Expression (6) may be satisfied:

$$c/a \geq \frac{1}{20} \quad (6)$$

in Expression (6), "c" is a width of the linear recess excluding the large-width recess.

[5] A touch sensor according to the invention is a touch sensor including: a substrate; a net-shaped electrode which is provided on the substrate and includes conductive wires arranged in a net form; and an outer edge wire which is provided in at least a part of an outer edge of the net-shaped electrode and is integrally formed with the net-shaped electrode, wherein the outer edge wire includes: a first extension wire portion which extends along a first direction and is connected to the net-shaped electrode; and a second extension wire portion which extends from the first extension wire portion along a second direction and is connected to the net-shaped electrode, and the first and second directions are directions on different straight lines.

[6] In the above invention, Expression (7) may be satisfied:

$$15[°] < \theta < 165[°] \quad (7)$$

in Expression (7), "θ" is an angle between the first and second directions on a side where the net-shaped electrode is connected.

[7] A touch sensor according to the invention is a touch sensor including: a substrate; a net-shaped electrode which is provided on the substrate and includes conductive wires arranged in a net form; and an outer edge wire which is provided in at least a part of an outer edge of the net-shaped electrode and is integrally formed with the net-shaped electrode, wherein the outer edge wire includes a curved portion.

[8] A production method for a touch sensor according to the invention is a production method for a touch sensor, including: a first step of filling a conductive paste in a recess pattern formed in an intaglio and moving a doctor blade so as to slide with respect to the intaglio; and a second step of transferring the conductive paste to a transfer object, wherein the recess pattern includes: a net-shaped recess which includes linear recesses arranged in a net form; and an outer edge recess which is provided to be continuous to at least a part of an outer edge of the net-shaped recess, and the outer edge recess includes: a first extension portion which extends along a first direction and is connected to the net-shaped recess; and a second extension portion which extends from the first extension portion along a second direction and is connected to the net-shaped recess, and the first and second directions are directions on different straight lines.

[9] In the above invention, Expression (8) may be satisfied:

$$15[°]<\theta<165[°] \tag{8}$$

Expression (8), "θ" is an angle between the first and second directions on a side where the net-shaped electrode is connected.

[10] A production method for a touch sensor according to the invention is a production method for a touch sensor, including: a first step of filling a conductive paste in a recess pattern formed in an intaglio and moving a doctor blade so as to slide with respect to the intaglio; and a second step of transferring the conductive paste to a transfer object, wherein the recess pattern includes: a net-shaped recess which includes linear recesses arranged in a net form; and an outer edge recess which is provided to be continuous to at least a part of an outer edge of the net-shaped recess, and the outer edge recess includes a curved portion.

Effect of the Invention

According to the invention, it is possible to suppress a disconnection between the net-shaped electrode and the outer edge wire and to secure reliable conductivity between the net-shaped electrode and the outer edge wire.

BRIEF DESCRIPTION OF DRAWINGS

FIGS. 15(A) to 15(D) are plan views illustrating modified examples of an outer edge recess according to the invention, in which FIG. 15(A) illustrates a first modified example, FIG. 15(B) illustrates a second modified example, FIG. 15(C) illustrates a third modified example, and FIG. 15(D) illustrates a fourth modified example;

FIGS. 16(A) to 16(D) are plan views illustrating modified examples of an outer edge wire according to the invention, in which FIG. 16(A) illustrates a first modified example, FIG. 16(B) illustrates a second modified example, FIG. 16(C) illustrates a third modified example, and FIG. 16(D) illustrates a fourth modified example;

MODE(S) FOR CARRYING OUT THE INVENTION

First Embodiment

Figure 1:
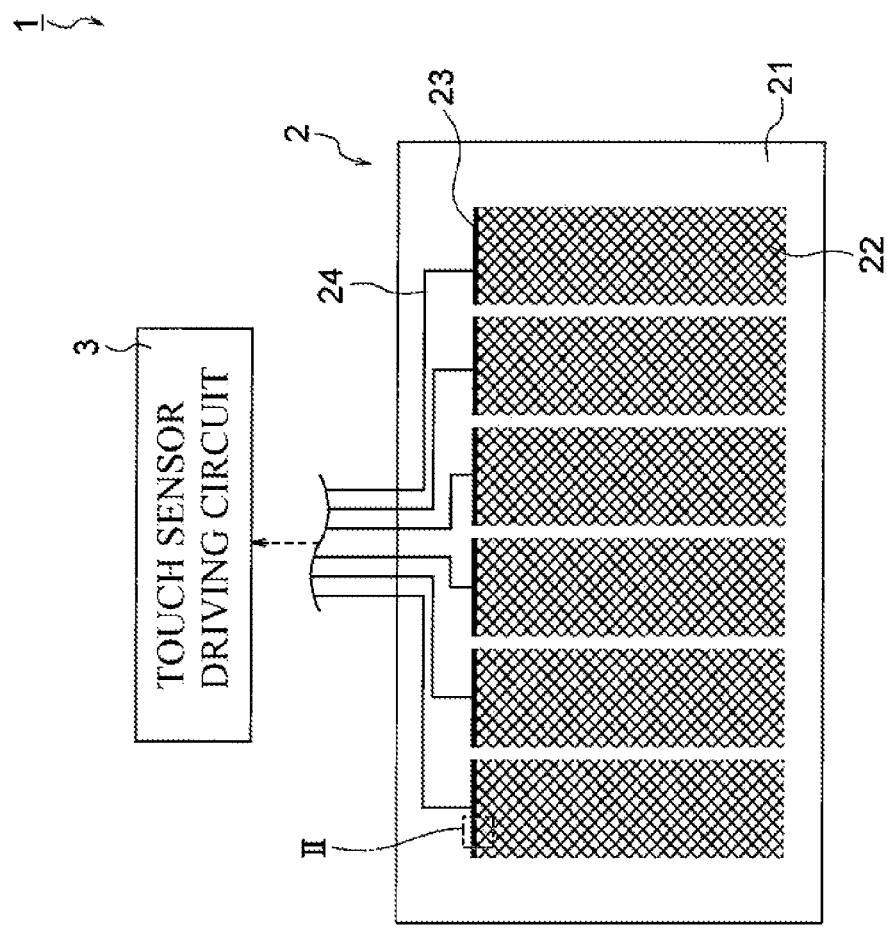
FIG. 1 is a plan view illustrating an entire structure of a touch key including a touch sensor according to a first embodiment of the invention.

Hereinafter, embodiments of the invention will be described based on the drawings. In the drawings used in the following description, portions serving as main parts are sometimes illustrated at an enlarged scale in order to make the features of the invention better understood for the sake of convenience, and the dimensional ratios of respective constituent elements are not necessarily the same as actual dimensional ratios.

Figure 2:
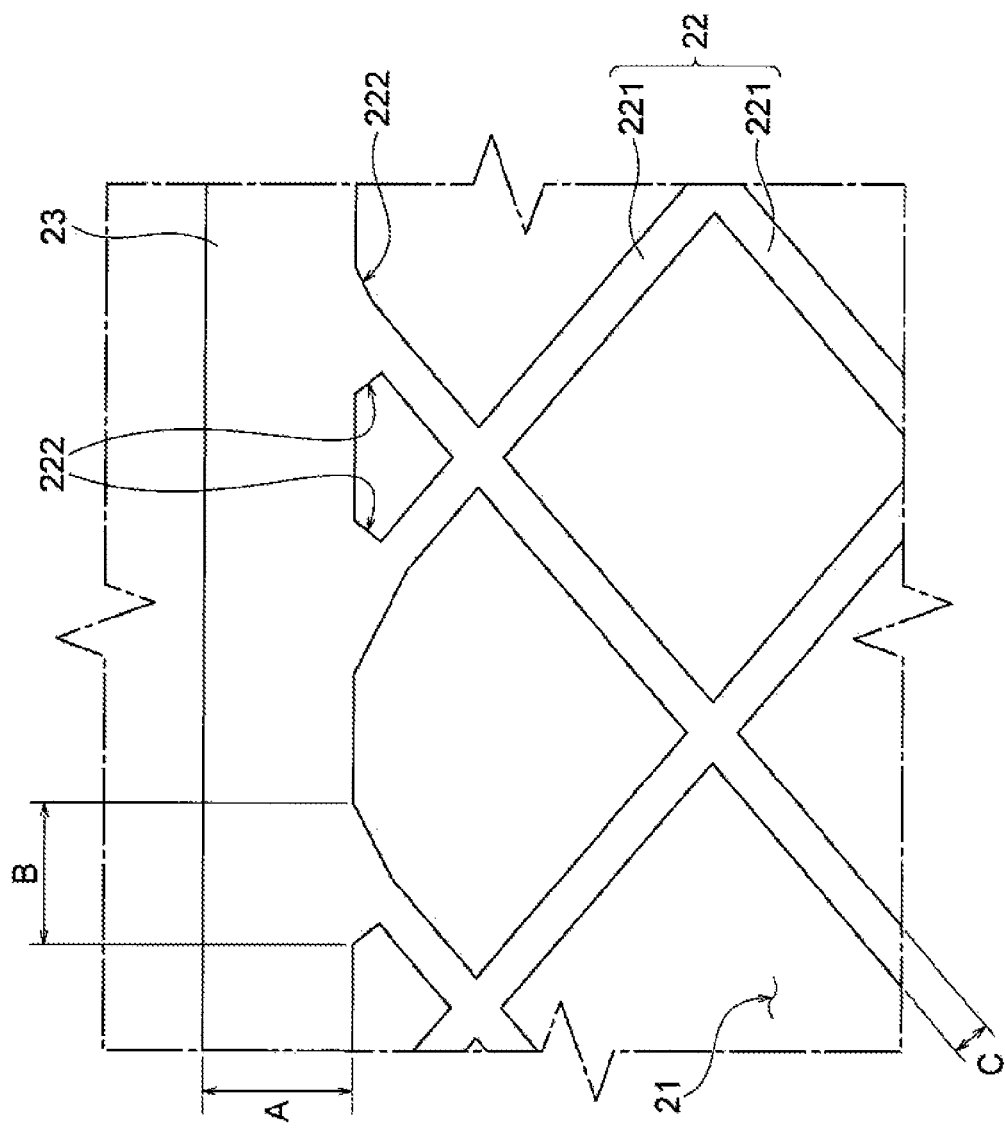
FIG. 2 is an enlarged view of part II in FIG. 1.

FIG. 1 is a plan view illustrating an entire structure of a touch key 1 including a touch sensor 2 of the invention, and FIG. 2 is an enlarged view of part II in FIG. 1.

As illustrated in FIG. 1, the touch key 1 including the touch sensor 2 of the invention includes, in addition to the touch sensor 2, a touch sensor driving circuit 3 connected to the touch sensor 2.

The touch sensor 2 includes a substrate 21, a plurality of (in this example, six) net-shaped (mesh-shaped) electrodes 22 formed on the substrate 21, an outer edge wire 23 provided in an outer edge of each of the net-shaped electrodes 22, and a connection wire 24 that connects the outer edge wires 23 to the touch sensor driving circuit 3.

The substrate 21 is an insulating transparent substrate formed of a transparent film, such as the film of polyethylene terephthalate (PET), polyethylene naphthalate (PEN), or polyimide (PI), glass, or the like. Thus, when a backlight (not illustrated) such as LED is disposed under the touch sensor 2, light from the backlight passes through the touch sensor 2.

The net-shaped electrode 22 is formed by printing a conductive paste on the substrate 21 using a gravure offset printing machine 4 described later and curing the conductive paste. Examples of the conductive paste include a silver (Ag) paste and a copper (Cu) paste.

As illustrated in FIG. 2, the net-shaped electrode 22 has a mesh shape in which a plurality of conductive wires 221 are formed so as to cross each other approximately at right angles. A net shape of the net-shaped electrode is not particularly limited. For example, the net-shaped electrode may have a net shape such as a square shape, a rectangular shape, or a rhombic shape and may have a hexagonal (honeycomb) net shape.

As illustrated in FIGS. 1 and 2, the outer edge wire 23 is formed so as to extend along the upper side of the net-shaped electrode 22 in the drawing. The outer edge wire 23 is formed integrally with the net-shaped electrode 22 using the same material and method as those of the net-shaped electrode 22. The position in the outer edge of the net-shaped electrode 22, at which the outer edge wire 23 is provided, is not particularly limited. For example, the outer edge wire 23 may be provided in the entire outer edge of the net-shaped electrode 22.

In the present embodiment, a width A of the outer edge wire 23 satisfies Expression (1) below.

$$A \leq 100 \, [\mu m] \tag{1}$$

In the present embodiment, as illustrated in FIG. 2, a large-width portion 222 which gradually widens according to approaching the outer edge wire 23 is provided in a connection portion, and the connection portion is a potion of the conductive wire 221 of the net-shaped electrode 22 which is connected to the outer edge wire 23. In the present embodiment, although the large-width portion 222 is provided in both lateral portions of the connection portion of the conductive wire 221, the invention is not particularly limited to this. For example, the large-width portion 222 may be provided in only one of the lateral portions of the connection portion of the conductive wire 221.

In the present embodiment, the width "A" of the outer edge wire 23, a largest width "B" of the conductive wire 221 in a portion where the large-width portion 222 is provided, and a width "C" of the conductive wire 221 excluding the large-width portion 222 satisfy Expressions (2) and (3) below. It is not essential but it is preferable to satisfy Expression (3) below.

$$B/A \geq \frac{1}{2} \tag{2}$$

$$C/A \geq \frac{1}{20} \tag{3}$$

In Expression (3), "C" indicates an average width of the entire conductive wire 221 in the portions excluding the large-width portion 222. In Expression (2), "B/A" is preferably equal to or smaller than 1 ($1 \geq B/A$). In Expression (3), "C/A" is preferably equal to or smaller than ½ ($\frac{1}{2} \geq C/A$).

The touch sensor 2 having the above-described configuration is connected to the touch sensor driving circuit 3 via the connection wire 24. The connection wire 24 is formed using the same material and method as those of the net-shaped electrode 22 and is formed integrally with the outer edge wire 23.

The touch sensor driving circuit 3 includes an oscillator that outputs a high-frequency voltage to the net-shaped electrode 22, a detector that detects a change in a terminal voltage of the net-shaped electrode 22 when a user touches on the surface of the substrate 21, and a determiner that determines whether the change in voltage is larger than a predetermined threshold. When the finger of a user touches on the net-shaped electrode 22 through the substrate 21 during inputting, the high-frequency voltage output from the oscillator bypasses through the net-shaped electrode 22, the substrate 21, and the finger of the user, and the terminal voltage of the net-shaped electrode 22 decreases as compared to that before inputting. The detector detects the terminal voltages of the net-shaped electrode 22 before and after the inputting, and the determiner determines the change in voltage. In this way, the position at which the user has touched is determined.

In the present embodiment, although the touch sensor is used as the touch key as described above, the invention is not particularly limited to this. For example, a touch sensor may be used as the touch panel. In this case, the touch panel has a structure in which a plurality of net-shaped electrodes arranged in parallel are disposed so as to cross at right angles in a plan view so that the position (the positions in X-axis and Y-axis directions) on the touch panel at which the user has touched is detected.

Figure 3:
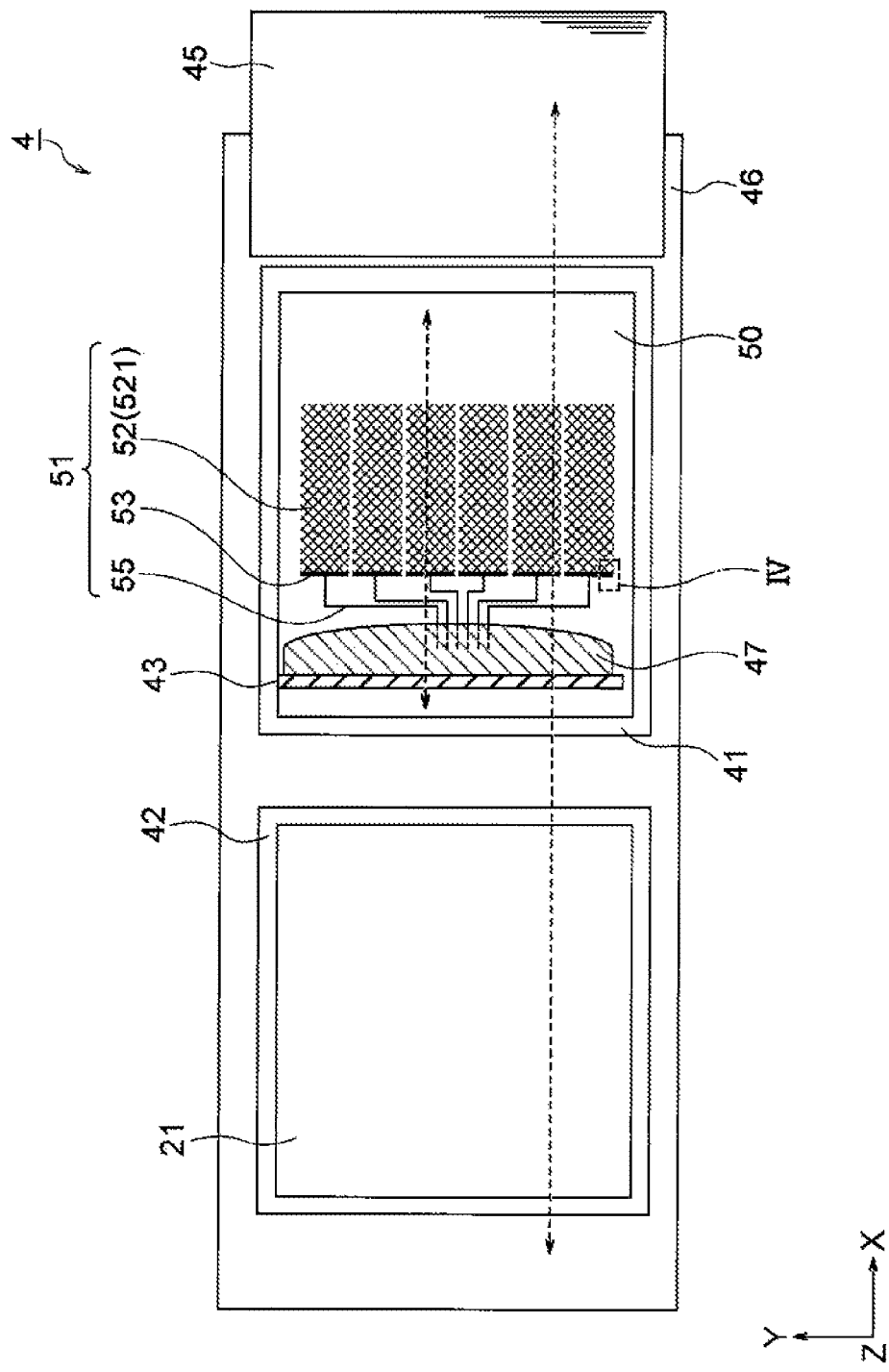
FIG. 3 is a plan view illustrating a production apparatus in a first step of a production method for the touch sensor according to the first embodiment of the invention.
Figure 4:
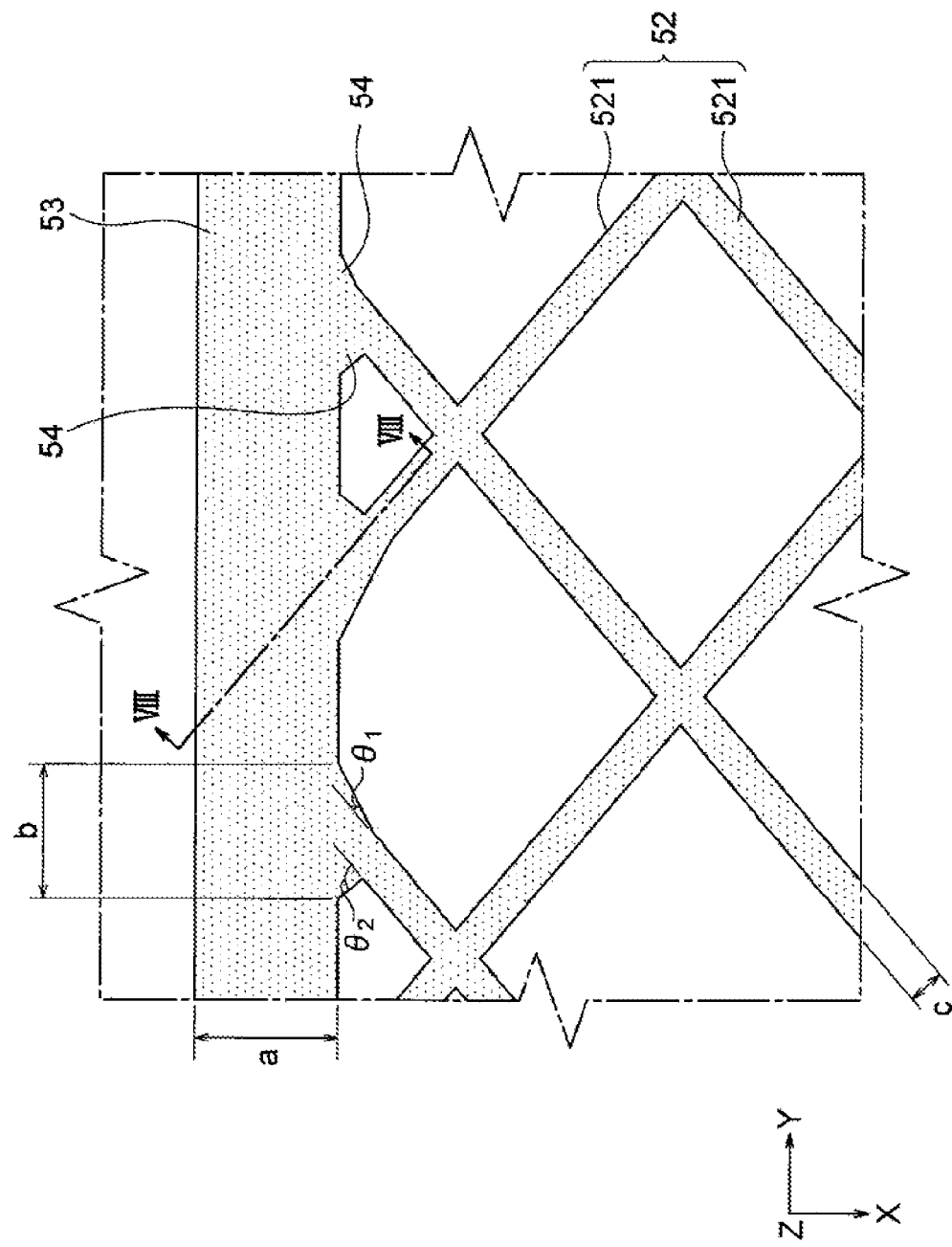
FIG. 4 is an enlarged view of part IV in FIG. 3.
Figure 5:
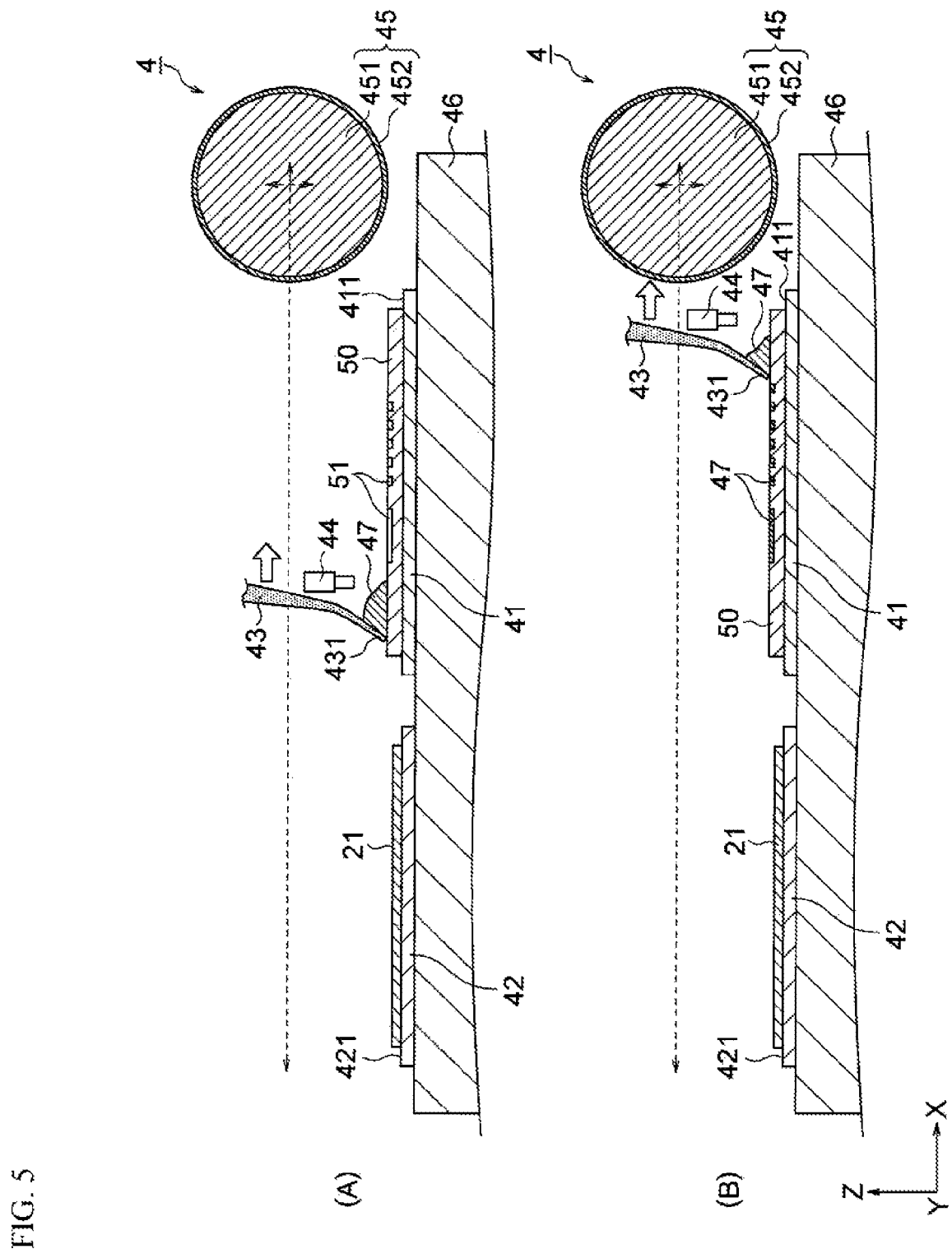
FIGS. 5(A) and 5(B) are cross-sectional views illustrating the production apparatus in the first step of the production method for the touch sensor according to the first embodiment of the invention.
Figure 6:
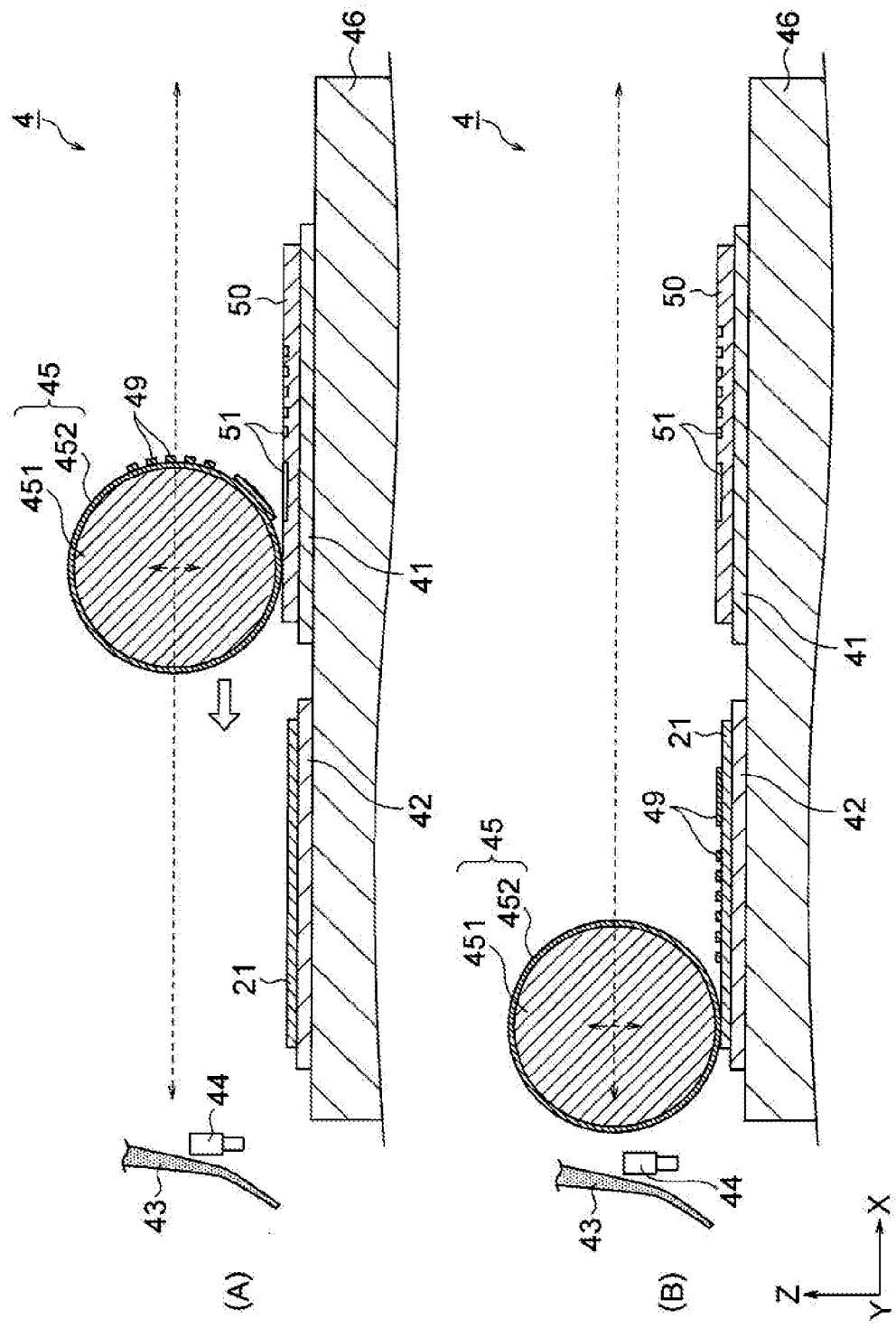
FIGS. 6(A) and 6(B) are cross-sectional views illustrating the production apparatus in a second step of the production method for the touch sensor according to the first embodiment of the invention.

FIG. 3 is a plan view illustrating a production apparatus in a first step of a production method for the touch sensor 2 of the present embodiment, FIG. 4 is an enlarged view of portion IV in FIG. 3, FIGS. 5(A) and 5(B) are cross-sectional views illustrating the production apparatus in the first step of the production method for the touch sensor 2 of the present embodiment, and FIGS. 6(A) and 6(B) are cross-sectional views illustrating the production apparatus in a second step of the production method for the touch sensor 2 of the present embodiment. The first step is a paste filling step of filling a conductive paste into a recess pattern, and the second step is a transferring step of transferring the conductive paste filled in the recess pattern to the substrate 21.

During producing of the touch sensor 2 of the present embodiment, the gravure offset printing machine 4 is used as the production apparatus, and the net-shaped electrode 22, the outer edge wire 23, and the connection wire 24 are formed on the substrate 21 by simultaneously printing and curing.

As illustrated in FIGS. 3 and 5(A), the gravure offset printing machine 4 includes a plate table 41, a base table 42, a doctor blade 43, a dispenser 44, a transfer roller 45, and an apparatus frame (stand) 46.

The plate table 41 is fixed horizontally to the apparatus frame 46 and has a holding surface 411 on which a planar intaglio (a recessed plate, a gravure plate) 50 is placed. A plurality of adsorbing openings (not illustrated in particular) are formed in the holding surface 411 so that the intaglio 50 can be adsorbed and held. A method for fixing the intaglio 50 on the plate table 41 is not particularly limited to this.

A recess pattern 51 is formed on the upper surface of the intaglio 50 by etching a metal layer formed of copper or the like. The recess pattern 51 has a recess pattern corresponding to the net-shaped electrode 22, the outer edge wire 23, and the connection wire 24 of the touch sensor 2.

Specifically, as illustrated in FIG. 3 or 4, the recess pattern 51 includes: a linear recess 521 corresponding to the conductive wire 221 that forms the net-shaped electrode 22; a net-shaped recess 52 (corresponding to the net-shaped electrode 22) formed by the linear recesses 521; an outer edge recess 53 corresponding to the outer edge wire 23; a large-width recess 54 corresponding to the large-width portion 222, and a connection recess 55 corresponding to the connection wire 24. In the present embodiment, the outer edge recess 53 is formed to be continuous to the net-shaped recess 52. The large-width recess 54 is formed in a connection portion in which the linear recess 521 and the outer edge recess 53 are connected to each other, and the large-width recess 54 gradually widens according to approaching the outer edge recess 53. In the present embodiment, the large-width recess 54 is provided in both lateral portions of the connection portion, and the connection portion is a portion of the linear recess 521 which is connected to the outer edge recess 53. When the large-width portion 222 is provided in only one of the lateral portions of the connection portion of the conductive wire 221, the large-width recess 54 is provided in only one of the lateral portions of the linear recess 521.

In the present embodiment, since the outer edge wire 23 corresponds to the outer edge recess 53 and the large-width portion 222 corresponds to the large-width recess 54, Expressions (4), (5), and (6) below are satisfied. It is not essential but it is preferable to satisfy Expression (6) below.

$$a \leq 100 \ [\mu m] \tag{4}$$

$$b/a \geq \tfrac{1}{2} \tag{5}$$

$$c/a \geq \tfrac{1}{20} \tag{6}$$

In Expressions (4), (5), and (6), "a" is the width of the outer edge recess 53, "b" is the largest width of the linear recess 521 in a portion where the large-width recess 54 is provided, and "c" is the width of the linear recess 521 excluding the large-width recess 54.

In Expression (6), "c" indicates an average width of the entire linear recess 521 in the portions excluding the large-width recess 54. In Expression (5), "b/a" is preferably equal to or smaller than 1 (1≥b/a). In Expression (6), "c/a" is preferably equal to or smaller than ½ (½≥c/a).

In the present embodiment, the base table 42 is fixed horizontally to the apparatus frame 46 and has a holding surface 421 on which the substrate 21 which is a printing object is placed. Similarly to the holding surface 411 of the plate table 41, a plurality of adsorbing openings are formed in the holding surface 421 so that the substrate 21 can be adsorbed and held. A method for fixing the substrate 21 on the base table 42 is not particularly limited to this.

The doctor blade 43 is configured to be movable along the X-axis and be raised and lowered along the Z-axis. The dispenser 44 that supplies the conductive paste 47 onto the intaglio 50 is disposed near the doctor blade 43. The dispenser 44 is configured to be movable along the X and Z-axes together with the doctor blade 43. Examples of a mechanism for moving the doctor blade 43 and the dispenser 44, which is not illustrated in particular, include a ball screw mechanism which uses a motor. The doctor blade 43 may be moved independently from the dispenser 44. In this case, the doctor blade 43 may be moved after the dispenser 44 is moved.

In the present embodiment, a distal end of the doctor blade 43 slides on the intaglio 50 held on the plate table 41 along the X-axis with the conductive paste 47 supplied onto the intaglio 50 by the dispenser 44. In this way, the conductive paste 47 is filled into the recess pattern 51.

The transfer roller 45 includes a blanket cylinder 451 and a blanket 452 wound around an outer circumference of the blanket cylinder 451 and formed of silicon rubber or the like.

The transfer roller 45 is supported so as to be rotatable about a central axis of the blanket cylinder 451. The transfer roller 45 is configured to be movable along the X-axis and be raised and lowered along the Z-axis. Examples of a mechanism for moving the transfer roller 45, which is not illustrated in particular, include a rack-and-pinion gear mechanism which uses a motor. The transfer roller 45 may be movable along the X-axis together with the doctor blade 43 and the dispenser 44.

When the touch sensor 2 is produced using the gravure offset printing machine 4 described hereinabove, first, as a first step, as illustrated in FIGS. 5(A) and 5(B), the doctor blade 43 and the dispenser 44 are moved along the positive X-axis direction in the drawings in a state where the conductive paste 47 is supplied onto the intaglio 50 from the dispenser 44 and the doctor blade 43 is in contact with the intaglio 50. In this way, the distal end 431 of the doctor blade 43 slides on the intaglio 50.

Subsequently, as a second step, as illustrated in FIG. 6(A), the doctor blade 43 and the dispenser 44 are retracted to the left end in the drawing in a state of being moved in the positive Z-axis direction, and the transfer roller 45 is moved along the negative X-axis direction in a state of being pressed against the intaglio 50 on the plate table 41. In this way, the transfer roller 45 rolls on the intaglio 50, the conductive paste 47 filled in the recess pattern 51 of the intaglio 50 is received in the blanket 452 of the transfer roller 45, and a print pattern 49 is held on the blanket 452.

Subsequently, as illustrated in FIG. 6(B), the transfer roller 45 is moved to be pressed against the substrate 21 on the base table 42, and in this state, the transfer roller 45 is moved along the negative X-axis direction. In this way, the transfer roller 45 rolls on the substrate 21, and the print pattern 49 held on the blanket 452 of the transfer roller 45 is transferred to the substrate 21. The substrate 21 of the present embodiment corresponds to an example of a transfer object of the invention.

The print pattern 49 heated and cured using a far infrared radiation (IR) drying furnace or the like, which is not illustrated in particular, whereby the net-shaped electrode 22, the outer edge wire 23, and the connection wire 24 of the touch sensor 2 are formed.

Although the gravure offset printing machine 4 of the present embodiment is a sheet-fed printer that processes the substrate 21 one by one, the gravure offset printing machine 4 may be a roll-to-roll printer that successively conveys a long substrate.

Next, the operation of the present embodiment will be described.

First, a phenomenon occurring during producing of a conventional structure which does not have a large-width portion will be described.

FIGS. 7(A) to 7(D) are cross-sectional views illustrating the first step of producing a conventional touch sensor, and FIGS. 8(A) to 8(D) are cross-sectional views illustrating the first step of producing the touch sensor 2 of the invention.

Figure 7:
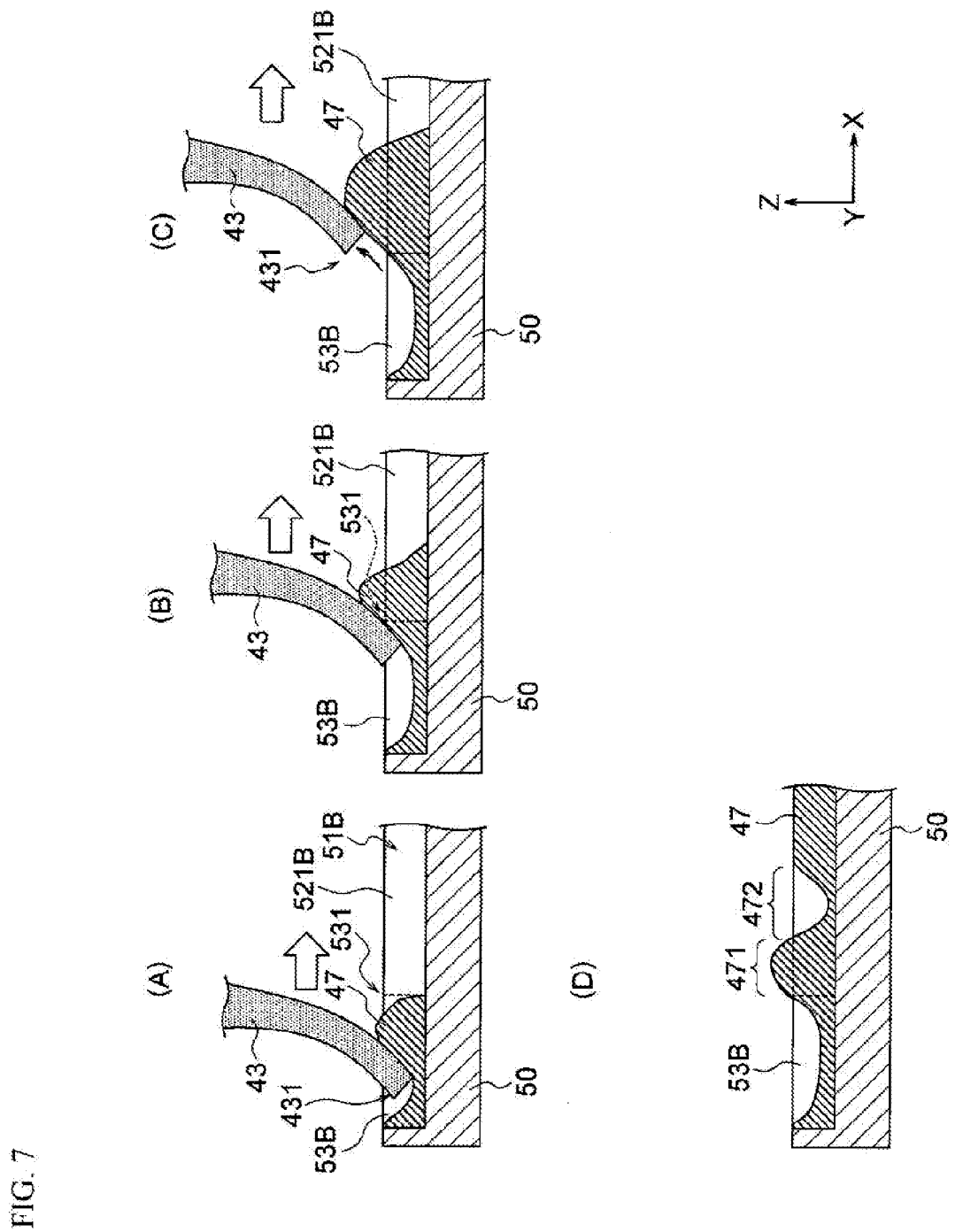
FIGS. 7(A) to 7(D) are diagrams illustrating the first step of producing a conventional touch sensor and are diagrams corresponding to the cross-sectional views along line VIII-VIII in FIG. 4.

Conventionally, when the conductive paste 47 is filled in a recess pattern 51B by the sliding doctor blade 43, if an outer edge recess 53B of the recess pattern 51B extends substantially in the same direction as an extension direction (Y-axis direction) of the doctor blade 43, the distal end 431 of the doctor blade 43 enters into the outer edge recess 53B when passing through the outer edge recess 53B (FIG. 7(A)).

Subsequently, the doctor blade 43 makes contact with an edge 531 of the outer edge recess 53B (FIG. 7(B)), and the distal end 431 of the doctor blade 43 jumps slightly in the positive Z-axis direction (FIG. 7(C)). With this jumping, the force of the doctor blade 43 pressing the conductive paste 47 toward a linear recess 521B weakens temporarily.

As a result, a portion 471 in which the conductive paste 47 is filled excessively and a portion 472 in which the conductive paste 47 is not filled sufficiently appear in a portion of the linear recess 521B near the outer edge recess 53B, whereby filling unevenness occurs (FIG. 7(D)). Thus, in a produced touch sensor, a portion in which the conductive wire 221 is not formed sufficiently may appear in a portion of the conductive wire 221 near the outer edge wire 23, and the conductive wire 221 may be disconnected.

In contrast, the width "a" of the outer edge recess 53 of the recess pattern 51 during producing of the touch sensor 2 according to the present embodiment satisfies Expression (4). Due to this, when the conductive paste 47 is filled in the recess pattern 51, even if the outer edge recess 53 is disposed in the same direction as the extension direction (Y-axis direction) of the doctor blade 43, the distal end 431 of the doctor blade 43 is suppressed from entering deep into the outer edge recess 53 (FIG. 8(A)).

Figure 8:
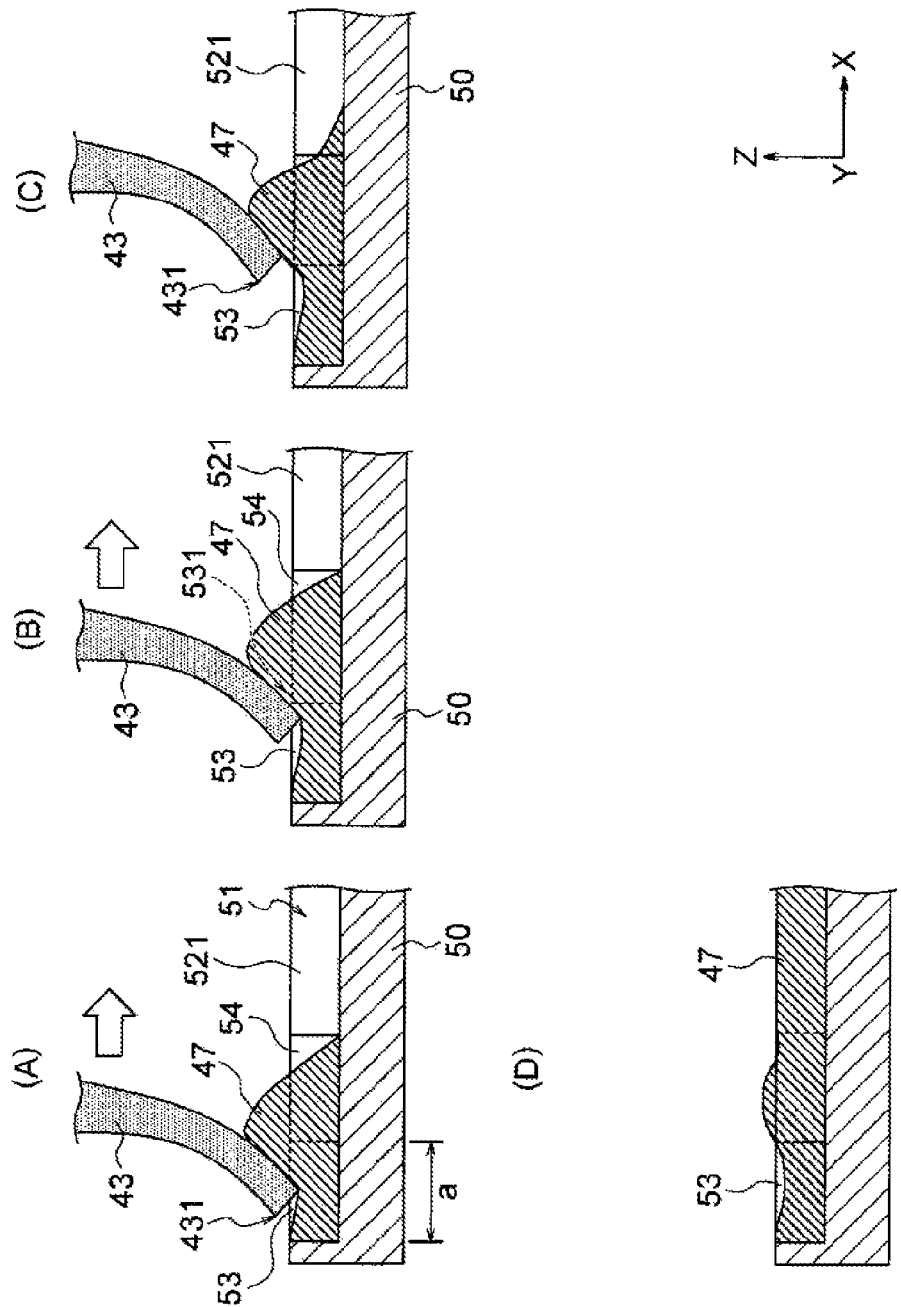
FIGS. 8(A) to 8(D) are diagrams illustrating the first step according to the invention during producing of the touch sensor according to the first embodiment of the invention and are cross-sectional views along line VIII-VIII in FIG. 4.

Thus, even when the doctor blade 43 makes contact with the edge 531 of the outer edge recess 53 (FIG. 8(B)), jumping of the distal end 431 of the doctor blade 43 is suppressed (FIG. 8(C)), and the occurrence of a portion in which the conductive paste 47 is filled excessively in the linear recess 521 can be suppressed.

Further, the linear recess 521 of the recess pattern 51 of the present embodiment has the large-width recess 54 which is disposed in the portion connected to the outer edge recess 53 and which widens according to approaching the outer edge recess 53. The width "a" of the outer edge recess 53 and the largest width "b" of the linear recess 521 in a portion where the large-width recess 54 is provided satisfy Expression (5).

Thus, when the doctor blade 43 passes through the edge 531, even if the force of the doctor blade 43 pressing the conductive paste 47 toward the linear recess 521 decreases slightly, insufficient filling of the conductive paste 47 is suppressed by the conductive paste 47 present in the large-width recess 54 (FIG. 8(D)). This effect is improved further when Expression (6) is satisfied and is improved furthermore when "c/a" in Expression (6) is equal to or smaller than ½ (½c/a).

In this manner, since the occurrence of filling unevenness during filling of the conductive paste 47 is suppressed, it is possible to suppress the occurrence of a disconnection of the conductive wire 221 near the outer edge wire 23 of the produced touch sensor 2. Moreover, due to the presence of the large-width portion 222, it is possible to improve physical strength in the connection portion between the conductive wire 221 and the outer edge wire 23 of the touch sensor 2 and to improve durability when heat cycle is applied. These effects are improved further when Expressions (1) to (3) are satisfied and are improved furthermore when "C/A" in Expression (3) is equal to or smaller than ½ (½C/A).

As illustrated in FIG. 4, inclination angles $\theta_1$ and $\theta_2$ (inclination angles of the large-width recesses 54 with respect to the extension direction of the linear recess 521) of the large-width recesses 54 which are formed on the right and left sides of one linear recess 521 satisfy the following Expressions (7) and (8).

$$15[°] \leq \theta_1 \quad (7)$$

$$15[°] \leq \theta_2 \quad (8)$$

In this case, the effect of suppressing the conductive paste 47 from being filled insufficiently in the linear recess 521 is improved further. Due to this, the occurrence of a disconnection of the conductive wire 221 of the produced touch sensor 2 can be suppressed further.

In the production method for the touch sensor 2 described above, since the outer edge wire 23 and the net-shaped electrode 22 can be formed by printing simultaneously without forming individually, it is possible to simplify the steps of producing the touch sensor 2.

Second Embodiment

Figure 9:
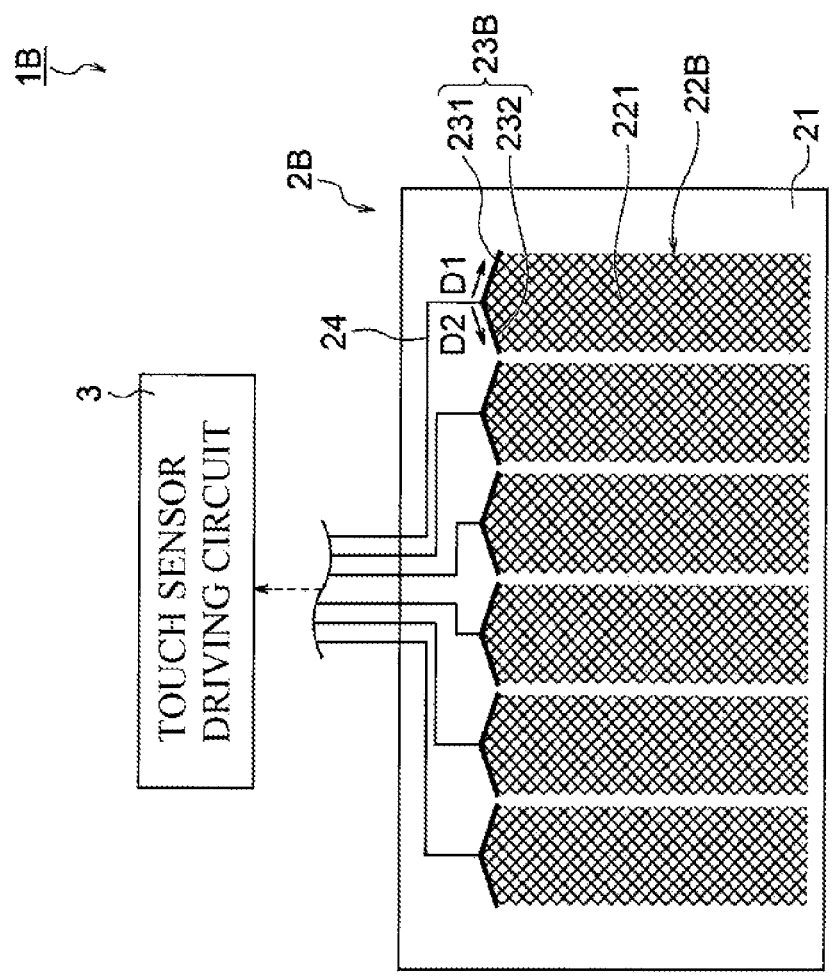
FIG. 9 is a plan view illustrating an entire structure of a touch key including a touch sensor according to a second embodiment of the invention.

FIG. 9 is a plan view illustrating a touch key 1B including a touch sensor 2B according to the invention.

As illustrated in FIG. 9, the touch key 1B including the touch sensor 2B of the invention includes, in addition to the touch sensor 2B, a touch sensor driving circuit 3 connected to the touch sensor 2B.

The touch sensor 2B includes a substrate 21, a plurality of (in this example, six) net-shaped electrodes 22B formed on a reverse side of the substrate 21, an outer edge wire 23B provided on an outer edge of each of the net-shaped electrodes 22B, and a connection wire 24 that connects the outer edge wires 23B to the touch sensor driving circuit 3.

The substrate 21 is an insulating transparent substrate formed of a transparent film, such as the film of polyethylene terephthalate (PET), polyethylene naphthalate (PEN), or polyimide (PI), glass, or the like. Thus, when a backlight (not illustrated) such as LED is disposed under the touch sensor 2B, light from the backlight passes through the touch sensor 2B.

The net-shaped electrode 22B is formed by printing a conductive paste on the substrate 21 using a gravure offset printing machine 4B and curing the conductive paste. Examples of the conductive paste include a silver (Ag) paste and a copper (Cu) paste.

The net-shaped electrode 22B has a mesh shape in which a plurality of conductive wires 221 are formed so as to cross each other. A net shape of the net-shaped electrode is not particularly limited. For example, the net-shaped electrode may have a net shape such as a square shape, a rectangular shape, or a rhombic shape and may have a hexagonal (honeycomb) net shape.

As illustrated in FIG. 9, the outer edge wire 23B includes: a first extension outer edge 231 extending in a down-right direction (the direction D1) in the drawing; and a second extension outer edge 232 extending in a down-left direction (the direction D2) in the drawing, the first and second extension outer edges being disposed in an upper portion of the net-shaped electrode 22B in the drawing. These first and second extension outer edges 231 and 232 are formed integrally with the net-shaped electrode 22B using the same material and method as those of the net-shaped electrode 22B. The shape of the outer edge wire and the position in which the outer edge wire is provided are not particularly limited. For example, the outer edge wire 23B may be provided in the entire outer edge of the net-shaped electrode 22B. The first extension outer edge 231 of the present embodiment corresponds to an example of a first extension wire portion of the invention, and the second extension outer edge 232 of the present embodiment corresponds to an example of a second extension wire portion of the invention.

The touch sensor 2B is connected to the touch sensor driving circuit 3 via the connection wire 24. In the present embodiment, the connection wire 24 is formed using the same material and method as those of the net-shaped electrode 22B and is formed integrally with the outer edge wire 23B.

The touch sensor driving circuit 3 includes an oscillator that outputs a high-frequency voltage to the net-shaped electrode 22B, a detector that detects a change in a terminal voltage of the net-shaped electrode 22B when a user touches on the surface of the substrate 21, and a determiner that determines whether the change in voltage is larger than a predetermined threshold. When the finger of a user touches on the net-shaped electrode 22B through the substrate 21 during inputting, the high-frequency voltage output from the oscillator bypasses through the net-shaped electrode 22B, the substrate 21, and the finger of the user, and the terminal voltage of the net-shaped electrode 22B decreases as compared to that before inputting. The detector detects the terminal voltages of the net-shaped electrode 22B before and after the inputting, and the determiner determines the change in voltage. In this way, the position at which the user has touched is determined.

In the present embodiment, although the touch sensor is used as the touch key as described above, the invention is not particularly limited to this. For example, a touch sensor may be used as the touch panel. In this case, the touch panel has a structure in which a plurality of net-shaped electrodes arranged in parallel are disposed so as to cross at right angles in a plan view so that the position (the positions in X-axis and Y-axis directions) on the touch panel at which the user has touched is detected.

Figure 10:
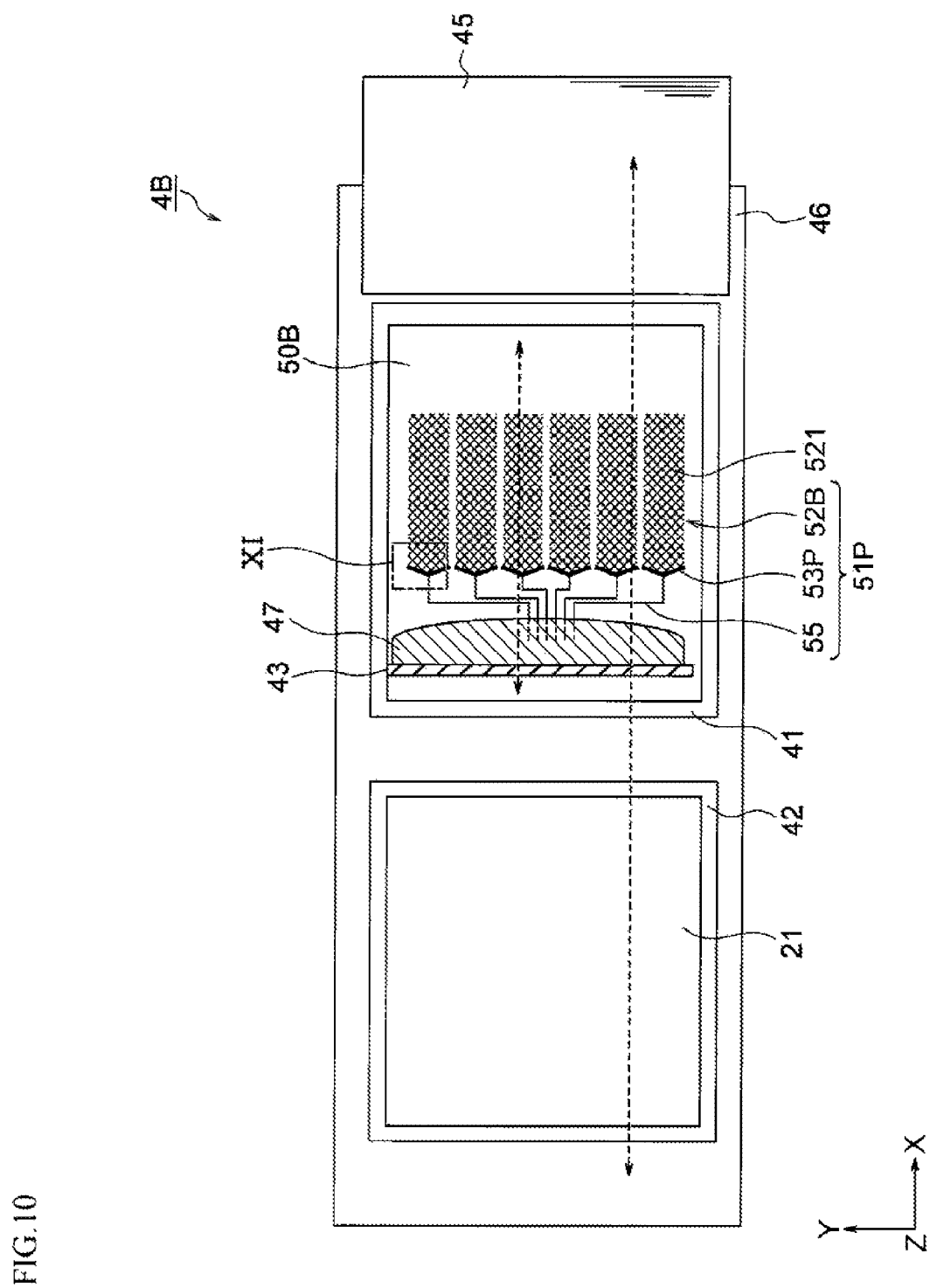
FIG. 10 is a plan view illustrating a production apparatus in a first step of a production method for the touch sensor according to the second embodiment of the invention.
Figure 11:
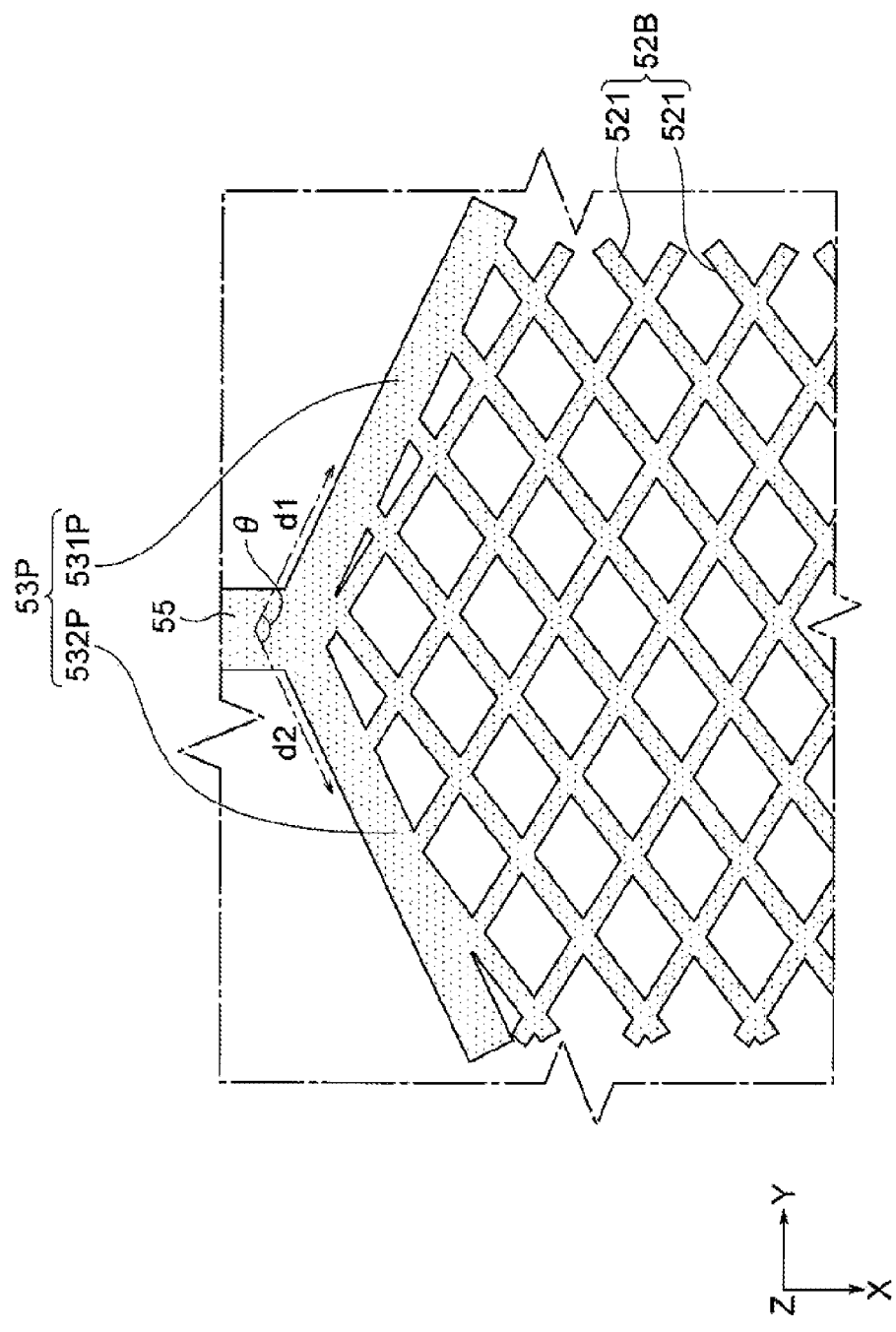
FIG. 11 is an enlarged view of part XI in FIG. 10.
Figure 12:
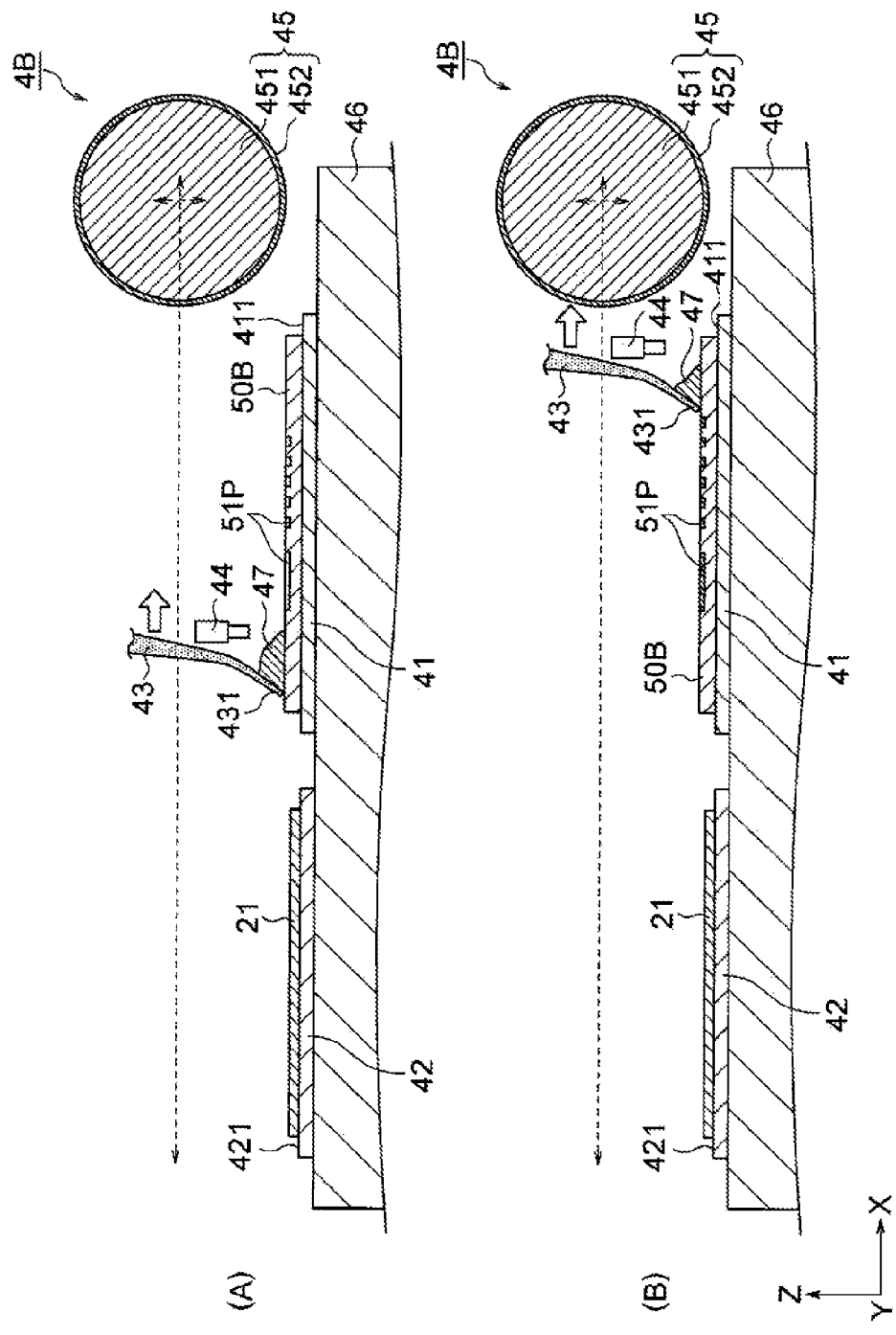
FIGS. 12(A) and 12(B) are cross-sectional views illustrating a production apparatus in the first step of the production method for the touch sensor according to the second embodiment of the invention.
Figure 13:
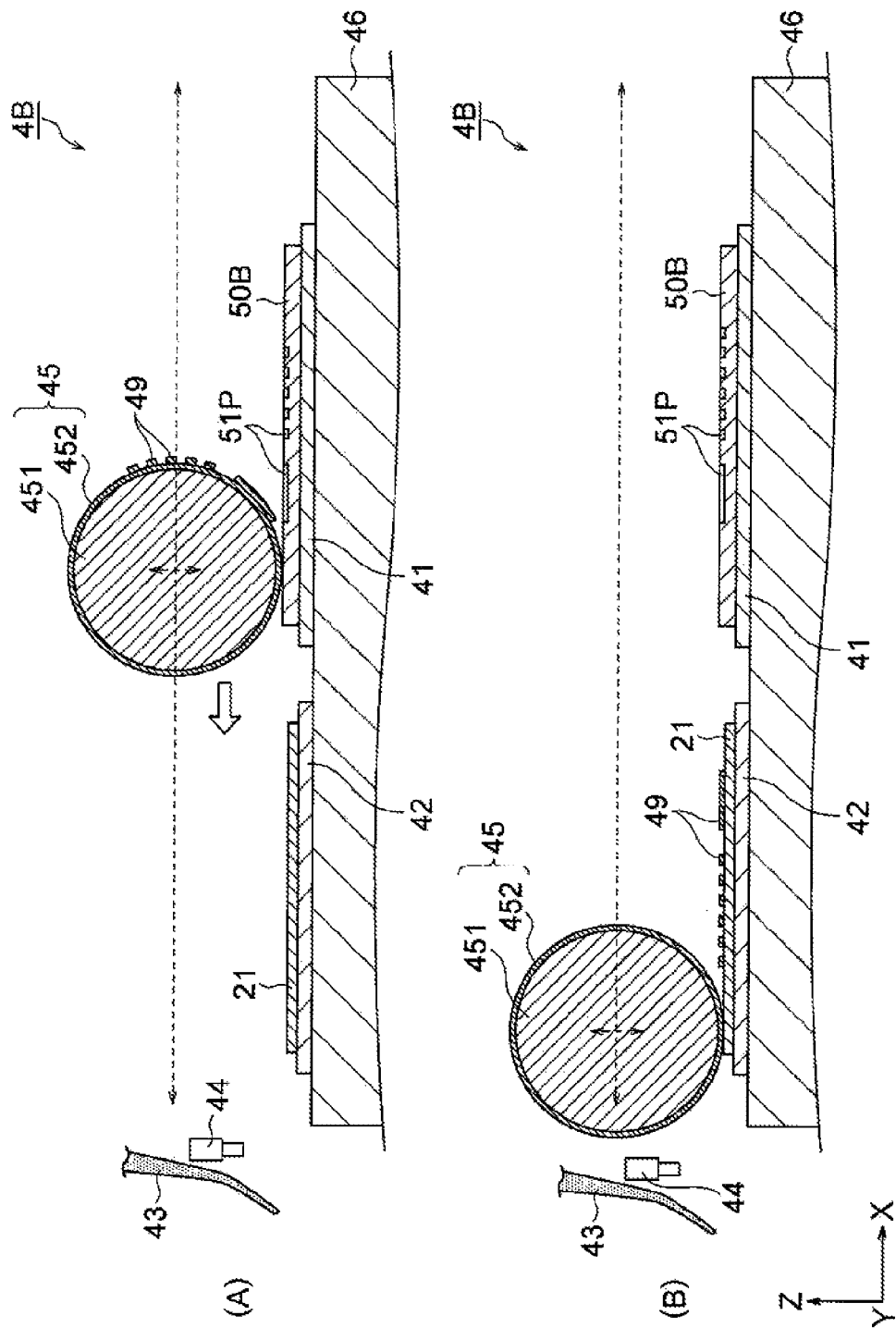
FIGS. 13(A) and 13(B) are cross-sectional views illustrating the production apparatus in a second step of the production method for the touch sensor according to the second embodiment of the invention.

FIG. 10 is a plan view illustrating a production apparatus in a first step of a production method for the touch sensor 2B of the present embodiment, FIG. 11 is an enlarged view of portion XI in FIG. 10, FIGS. 12(A) and 12(B) are cross-sectional views illustrating the production apparatus in the first step of the production method for the touch sensor 2B of the present embodiment, and FIGS. 13(A) and 13(B) are cross-sectional views illustrating the production apparatus in a second step of the production method for the touch sensor 2B of the present embodiment. The first step is a paste filling step of filling a conductive paste into a recess pattern, and the second step is a transferring step of transferring the conductive paste filled in the recess pattern to the substrate 21.

During producing of the touch sensor 2B of the present embodiment, the gravure offset printing machine 4B is used as the production apparatus, and the net-shaped electrode 22B, the outer edge wire 23B, and the connection wire 24 are formed on the substrate 21 by simultaneously printing and curing.

As illustrated in FIG. 10 or 12(A), the gravure offset printing machine 4B includes a plate table 41, a base table 42, a doctor blade 43, a dispenser 44, a transfer roller 45, and an apparatus frame (stand) 46.

The plate table 41 is fixed horizontally to the apparatus frame 46 and has a holding surface 411 on which a planar intaglio 50B (recess plate, gravure plate) is placed. A plurality of adsorbing openings (not illustrated in particular) are formed in the holding surface 411 so that the intaglio 50B can be adsorbed and held. A method for fixing the intaglio 50B on the plate table 41 is not particularly limited to this.

A recess pattern 51P is formed on the upper surface of the intaglio 50B by etching a metal layer formed of copper or the like. The recess pattern 51P has a recess pattern corresponding to the net-shaped electrode 22B, the outer edge wire 23B, and the connection wire 24 of the touch sensor 2B.

Specifically, as illustrated in FIG. 11, the recess pattern 51P includes: a linear recess 521 corresponding to the conductive wire 221 that forms the net-shaped electrode 22B; a net-shaped recess 52B (corresponding to the net-shaped electrode 22B) formed by the linear recesses 521; an outer edge recess 53P corresponding to the outer edge wire 23B; and a connection recess 55 corresponding to the connection wire 24. The outer edge recess 53P includes: a first extension portion 531P corresponding to the first extension outer edge 231; and a second extension portion 532P corresponding to the second extension outer edge 232 of the outer edge wire 23B.

In the present embodiment, the first and second extension portions 531P and 532P are continuously connected to at least a portion of the outer edge of the net-shaped recess 52B. The first extension portion 531P is provided along a direction d1 corresponding to the extension direction D1 of the first extension outer edge 231. Similarly, the second extension portion 532P is provided along a direction d2 corresponding to the extension direction D2 of the second extension outer edge 232. The directions d1 and d2 are directions on different straight lines, and an angle θ between the directions d1 and d2 on the side where the net-shaped recess 52B is connected satisfies Expression (9) below.

$$15[°] < θ < 165[°] \qquad (9)$$

In the present embodiment, the base table 42 is fixed horizontally to the apparatus frame 46 and has a holding surface 421 on which the substrate 21 which is a printing object is placed. Similarly to the holding surface 411 of the plate table 41, a plurality of adsorbing openings are formed in the holding surface 421 so that the substrate 21 can be adsorbed and held. A method for fixing the substrate 21 on the base table 42 is not particularly limited to this.

The doctor blade 43 is configured to be movable along the X-axis and be raised and lowered along the Z-axis. The dispenser 44 that supplies the conductive paste 47 onto the intaglio 50B is disposed near the doctor blade 43. The dispenser 44 is configured to be movable along the X and Z-axes together with the doctor blade 43. Examples of a mechanism for moving the doctor blade 43 and the dispenser 44, which is not illustrated in particular, include a ball screw mechanism which uses a motor. The doctor blade 43 may be moved independently from the dispenser 44. In this case, the doctor blade 43 may be moved after the dispenser 44 is moved.

In the present embodiment, a distal end of the doctor blade 43 slides on the intaglio 50B held on the plate table 41 along the X-axis with the conductive paste 47 supplied onto the intaglio 50B by the dispenser 44. In this way, the conductive paste 47 is filled into the recess pattern 51P.

The transfer roller 45 includes a blanket cylinder 451 and a blanket 452 wound around an outer circumference of the blanket cylinder 451 and formed of silicon rubber or the like. The transfer roller 45 is supported so as to be rotatable about a central axis of the blanket cylinder 451. The transfer roller 45 is configured to be movable along the X-axis and be raised and lowered along the Z-axis. Examples of a mechanism for moving the transfer roller 45, which is not illustrated in particular, include a rack-and-pinion gear mechanism which uses a motor. The transfer roller 45 may be movable along the X-axis together with the doctor blade 43 and the dispenser 44.

When the touch sensor 2B is produced using the gravure offset printing machine 4 described hereinabove, first, as a first step, as illustrated in FIGS. 12(A) and 12(B), the doctor blade 43 and the dispenser 44 are moved along the positive X-axis direction in the drawings in a state where the conductive paste 47 is supplied onto the intaglio 50B from the dispenser 44 and the doctor blade 43 is in contact with the intaglio 50B. In this way, the distal end 431 of the doctor blade 43 slides on the intaglio 50B.

Subsequently, as a second step, as illustrated in FIG. 13(A), the doctor blade 43 and the dispenser 44 are retracted to the left end in the drawing in a state of being moved in the positive Z-axis direction, and the transfer roller 45 is moved along the negative X-axis direction in a state of being pressed against the intaglio 50B on the plate table 41. In this way, the transfer roller 45 rolls on the intaglio 50B, the conductive paste 47 filled in the recess pattern 51P of the intaglio 50B is received in the blanket 452 of the transfer roller 45, and a print pattern 49 is held on the blanket 452.

Subsequently, as illustrated in FIG. 13(B), the transfer roller 45 is moved to be pressed against the substrate 21 on the base table 42, and in this state, the transfer roller 45 is moved along the negative X-axis direction. In this way, the transfer roller 45 rolls on the substrate 21, and the print pattern 49 held on the blanket 452 of the transfer roller 45 is transferred to the substrate 21. The substrate 21 of the present embodiment corresponds to an example of a transfer object of the invention.

The print pattern 49 is heated and cured using a far infrared radiation (IR) drying furnace or the like, which is not illustrated in particular, whereby the net-shaped electrode 22B, the outer edge wire 23B, and the connection wire 24 of the touch sensor 2B are formed.

Although the gravure offset printing machine 4B of the present embodiment is a sheet-fed printer that processes the substrate 21 one by one, the gravure offset printing machine 4B may be a roll-to-roll printer that successively conveys a long substrate.

Next, the operation of the present embodiment will be described.

First, a phenomenon occurring during producing of a conventional structure which has an outer edge wire having such a shape that the outer edge wire extends in one direction only will be described.

FIGS. 14(A) to 14(D) are cross-sectional views illustrating the first step of producing a conventional touch sensor.

Figure 14:
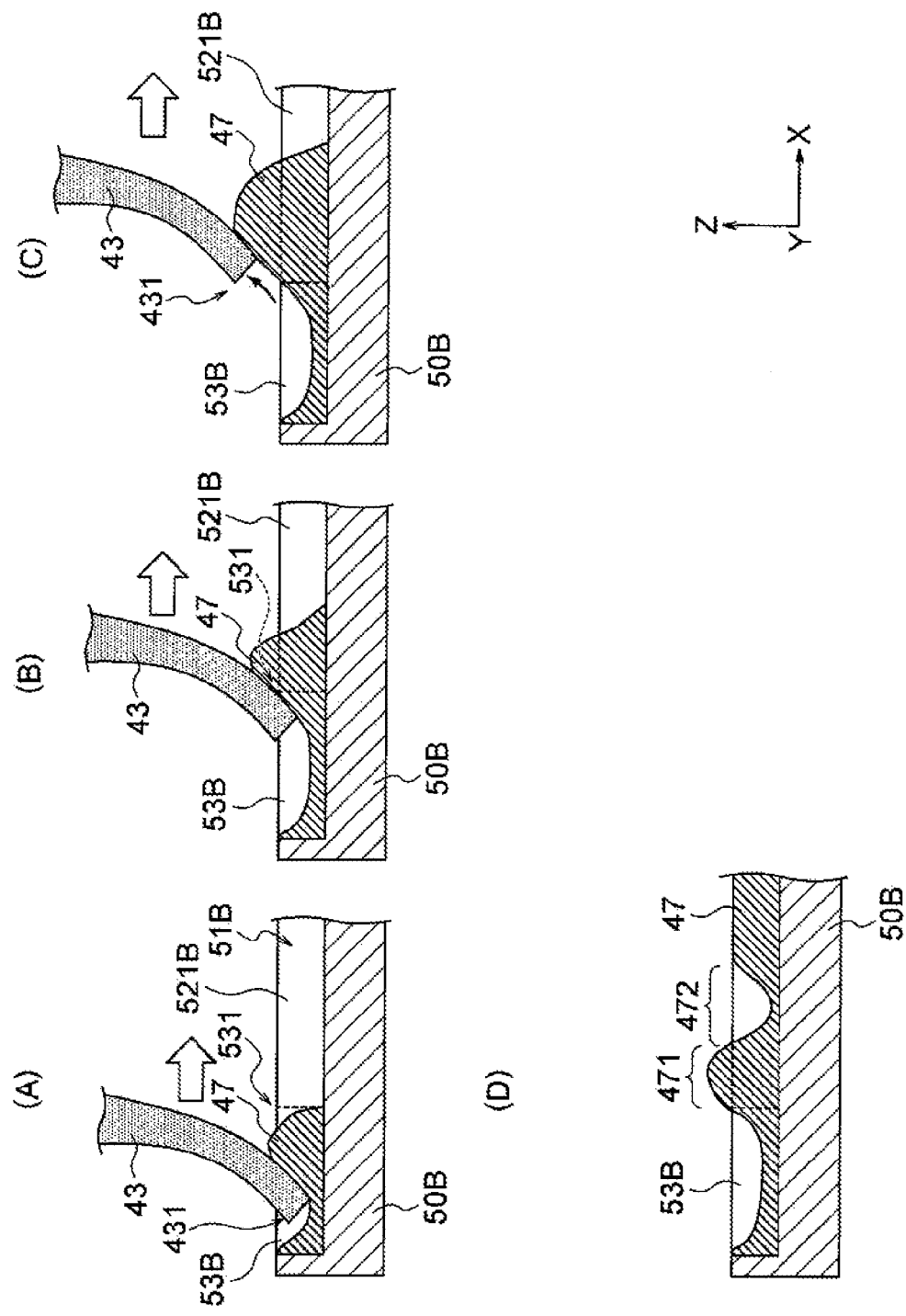
FIGS. 14(A) to 14(D) are cross-sectional views illustrating a first step of producing a conventional touch sensor.

Conventionally, when the conductive paste 47 is filled in a recess pattern 51B by the sliding doctor blade 43, if an outer edge recess 53B of the recess pattern 51B extends substantially in the same direction as an extension direction (Y-axis direction) of the doctor blade 43, the distal end 431 of the doctor blade 43 enters into the outer edge recess 53B when passing through the outer edge recess 53B (FIG. 14(A)).

Subsequently, the doctor blade 43 makes contact with an edge 531 of the outer edge recess 53B (FIG. 14(B)), and the distal end 431 of the doctor blade 43 jumps slightly in the positive Z-axis direction (FIG. 14(C)). With this jumping, the force of the doctor blade 43 pressing the conductive paste 47 toward a linear recess 521B weakens temporarily.

As a result, a portion 471 in which the conductive paste 47 is filled excessively and a portion 472 in which the conductive paste 47 is not filled sufficiently appear in a portion of the linear recess 521B near the outer edge recess 53B, whereby filling unevenness occurs (FIG. 14(D)). Thus, in a produced touch sensor, a portion in which the conductive wire 221 is not formed sufficiently may appear in a portion of the conductive wire 221 near the outer edge wire 23, and the conductive wire 221 may be disconnected.

In contrast, as illustrated in FIG. 11, the outer edge recess 53P of the recess pattern 51P during producing of the touch sensor 2B according to the present embodiment includes: the first extension portion 531P which is provided along the direction d1; and the second extension portion 532P which is provided along the direction d2 on a straight line different from that of the direction d1, and the first and second extension portions are connected to each other.

Due to this, when the conductive paste 47 is filled in the recess pattern 51P, all of the extension directions of the outer edge recesses 53P may not be substantially the same as the extension direction of the doctor blade 43. That is, even when the extension direction of any one of the first and second extension portions 531P and 532P is substantially the same as the extension direction of the doctor blade 43, the extension direction of the other of the first and second extension portions 531P and 532P is different from the extension direction of the doctor blade 43.

Due to this, during filling of the conductive paste 47, the conductive paste 47 in at least one of the first and second extension portions 531P and 532P will not be scraped up by the sliding doctor blade 43, and filling unevenness of the conductive paste 47 in the linear recess 521 will not occur in the entire region near the outer edge recess 53P. As a result, the occurrence of a disconnection between the outer edge wire 23B and the conductive wire 221 of the produced touch sensor 2B can be suppressed. This effect is improved further when the angle θ between the extension direction d1 of the first extension portion 531P and the extension direction d2 of the second extension portion 532P satisfies Expression (9).

Moreover, in the production method for the touch sensor 2B described above, since the outer edge wire 23B and the net-shaped electrode 22B can be formed by printing simultaneously without forming individually, it is possible to simplify the steps of producing the touch sensor 2B.

Moreover, in the touch sensor 2B including the outer edge wire 23B according to the present embodiment, the first extension outer edge 231 extends along the direction D1, and the second extension outer edge 232 extends along the direction D2 different from the direction D1. That is, the outer edge wire 23B has two different direction components. Due to this, even when external bending stress is applied to the touch sensor 2B so that the touch sensor 2B is bent, at least one of the first and second extension outer edges 231 and 232 can be prevented from being bent at a maximum bending angle. Therefore, it is possible to suppress a disconnection of the outer edge wire 23B due to bending stress and to improve the durability of the outer edge wire 23B against the bending stress.

The embodiments described herein above are presented in order to facilitate understanding of the present invention and are not presented to limit the present invention. Thus, the respective elements disclosed in the above embodiments are intended to cover all design alterations belonging to the technical scope of the invention and the equivalents thereof.

Figure 15:
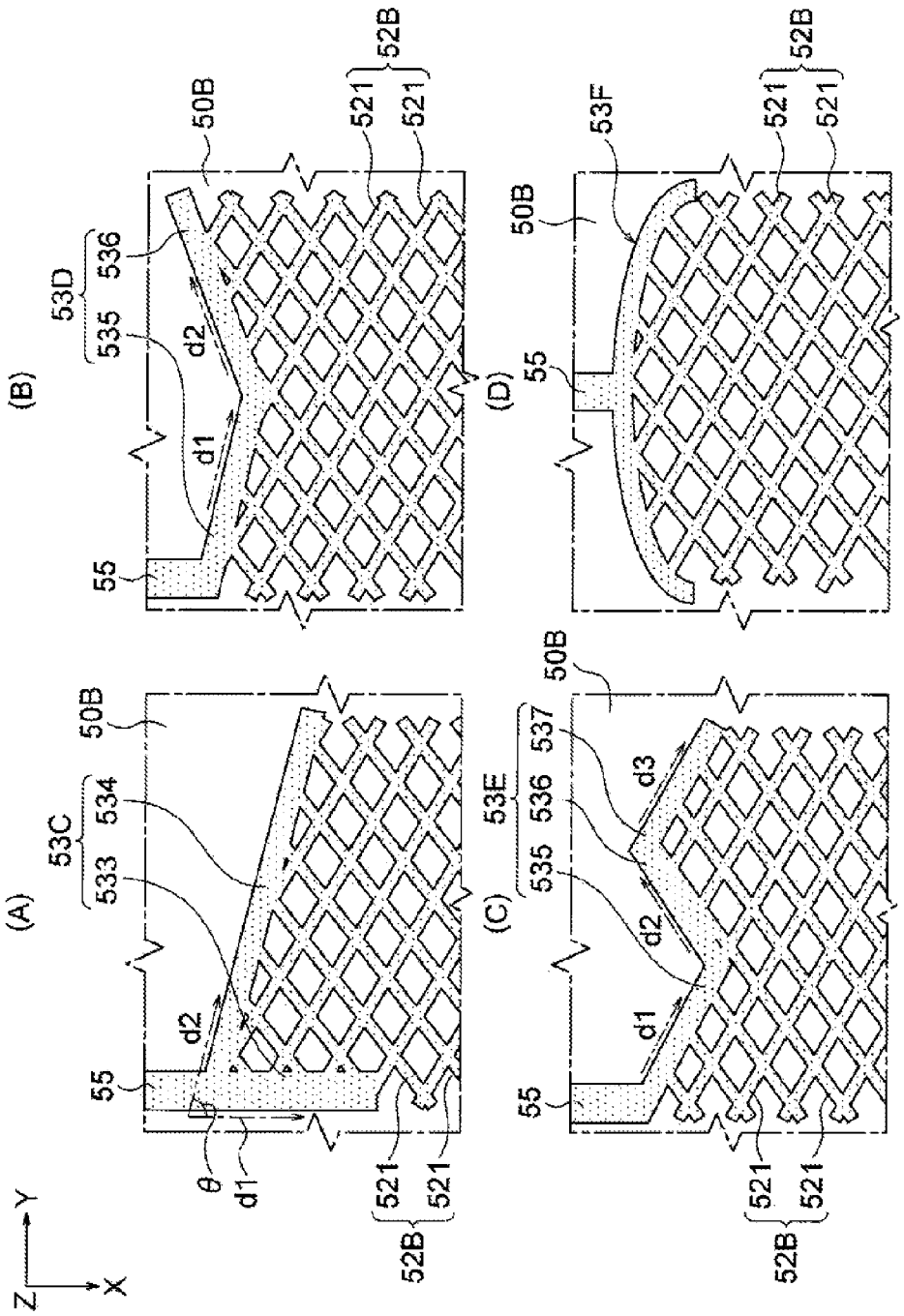
Figure 16:
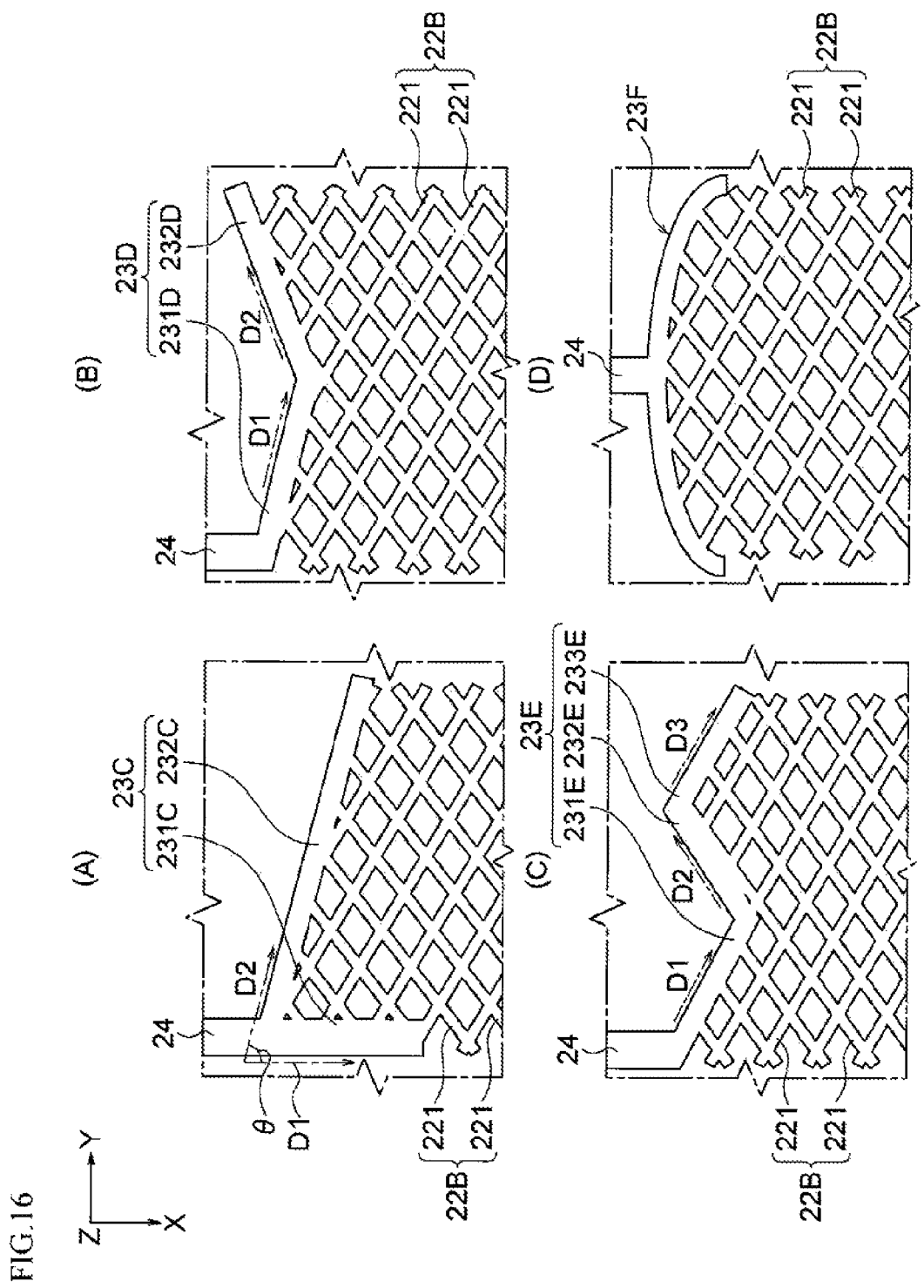

For example, as illustrated in FIG. 15(A), a touch sensor may be produced using an intaglio 50B in which an outer edge recess 53C includes: a first extension portion 533 which extends from the connection recess 55 along the X-axis direction (the direction d1); and a second extension portion 534 which extends from the first extension portion 533 along the down-right direction (the direction d2) in the drawing. In this case, as illustrated in FIG. 16(A), a touch sensor in which an outer edge wire 23C includes: a first extension outer edge 231C which extends from the wire 24 along the direction D1 (the direction corresponding to the direction d1); and a second extension outer edge 232C which extends from the first extension outer edge 231C along the direction D2 (the direction corresponding to the direction d2) is produced.

As illustrated in FIG. 15(B), a touch sensor may be produced using an intaglio 50B in which an outer edge recess 53D includes: a first extension portion 535 which extends from the connection recess 55 along the down-right direction (the direction d1) in the drawing; and a second extension portion 536 which extends from the right end of the first extension portion 535 in the drawing along the up-right direction (the direction d2) in the drawing. In this case, as illustrated in FIG. 16(B), a touch sensor in which an outer edge wire 23D includes: a first extension outer edge 231D which extends from the wire 24 along the direction D1 (the direction corresponding to the direction d1); and a second extension outer edge 232D which extends from the first extension outer edge 231D along the direction D2 (the direction corresponding to the direction d2) is produced.

As illustrated in FIG. 15(C), a touch sensor may be produced using an intaglio 50B in which an outer edge recess 53E includes a third extension portion 537 which extends from the right end of the second extension portion 536 of the outer edge recess 53D in the drawing along the down-right direction (the direction d3) in the drawing. In this case, as illustrated in FIG. 16(C), a touch sensor in which an outer edge wire 23E includes: a first extension outer edge 231E which extends from the wire 24 along the direction D1 (the direction corresponding to the direction d1); a second extension outer edge 232E which extends from the first extension outer edge 231E along the direction D2 (the direction corresponding to the direction d2); and a third extension outer edge 233E which extends from the second extension outer edge 232E along the direction D3 (the direction corresponding to the direction d3) is produced.

As illustrated in FIG. 15(D), a touch sensor may be produced using an intaglio 50B in which an outer edge recess 53F has such a shape that the outer edge recess is curved in the positive X-axis direction. In this case, as illustrated in FIG. 16(D), a touch sensor in which an outer edge wire 23F has such a shape that the outer edge wire is curved from the wire 24 along the downward direction in the drawing is produced. In this case, the shape of the outer edge recess or the outer edge wire is not particularly limited. For example, the outer edge recess may have such a shape that the outer edge recess is curved along the negative X-axis direction or may have such a curved shape that the outer edge recess waves along the Y-axis direction. Such a curved shape may be formed in at least a portion of an outer edge recess, and the outer edge recess may include a linear shape.

In the outer edge recesses 53C to 53F having the above-described shapes, at the time of filling of the conductive paste during printing, filling unevenness will not occur in the entire region near the boundary between the outer edge recesses 53C to 53F and the net-shaped recess 52B. Due to this, in a touch sensor produced using an intaglio including the outer edge recesses 53C to 53F, it is possible to suppress the occurrence of a disconnection between the outer edge wire 23B and the conductive wire 221 of the net-shaped electrode 22.

Moreover, in the touch sensor having the outer edge wires 23C to 23F having the above-described shapes, the outer edge wires 23C to 23F each have at least two different direction components. Thus, it is possible to suppress a disconnection of the outer edge wires 23C to 23F due to bending stress applied to the touch sensor and to improve the durability of the outer edge wires 23C to 23F against the bending stress.

Figure 17:
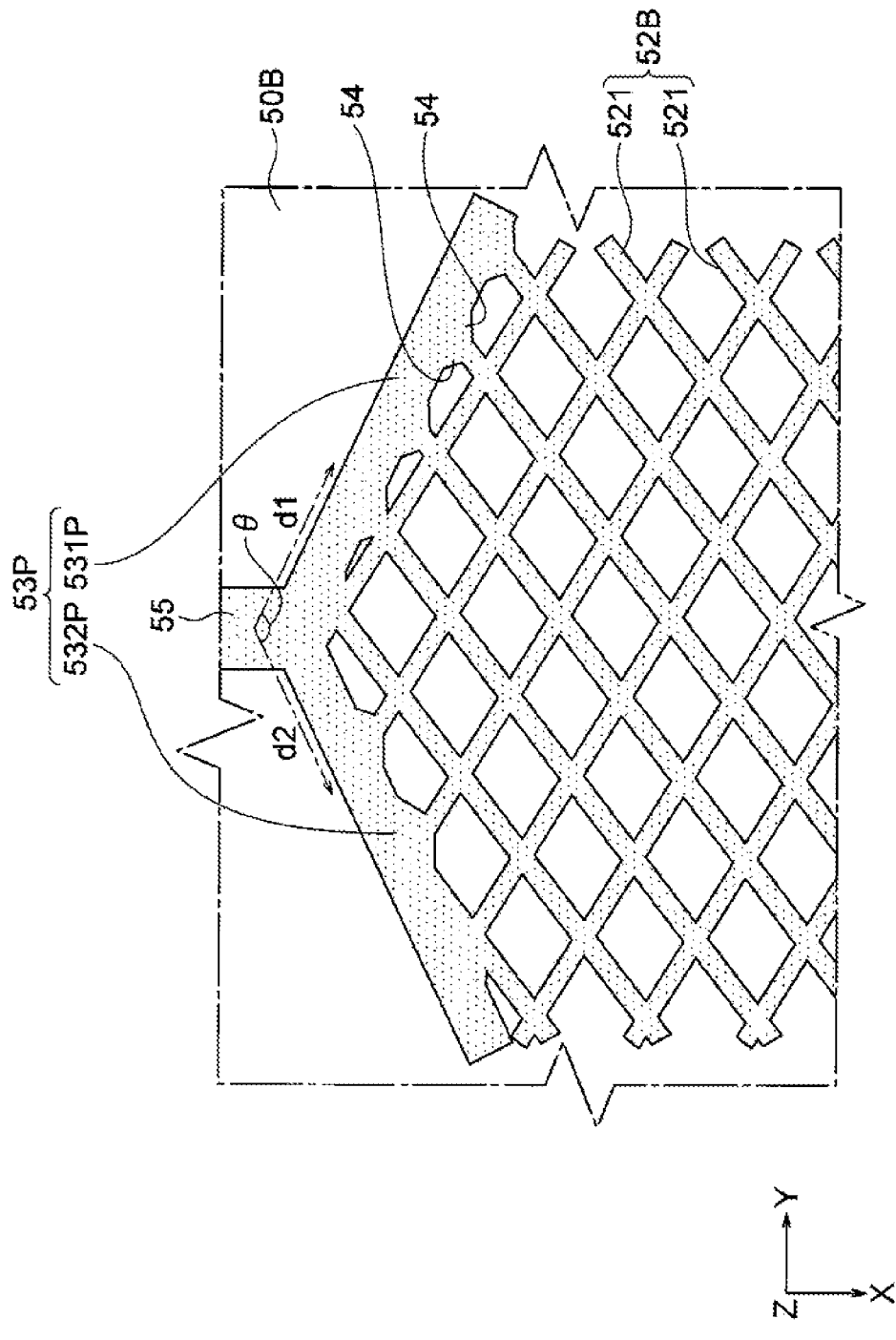
FIG. 17 is an enlarged view (corresponding to FIG. 11) illustrating a modified example of a production apparatus for the touch sensor according to the embodiments of the invention.

The large-width recess 54 described in the first embodiment may be applied to the invention described in the second embodiment. Specifically, for example, as illustrated in FIG. 17, a touch sensor may be produced using an intaglio 50B in which a large-width recess 54 which gradually widens according to approaching the first extension portion 531P is provided in a connection portion between the first extension portion 531P and the linear recess 521, and a large-width recess 54 which gradually widens according to approaching the second extension portion 532P is provided in a connection portion between the second extension portion 532P and the linear recess 521.

Figure 18:
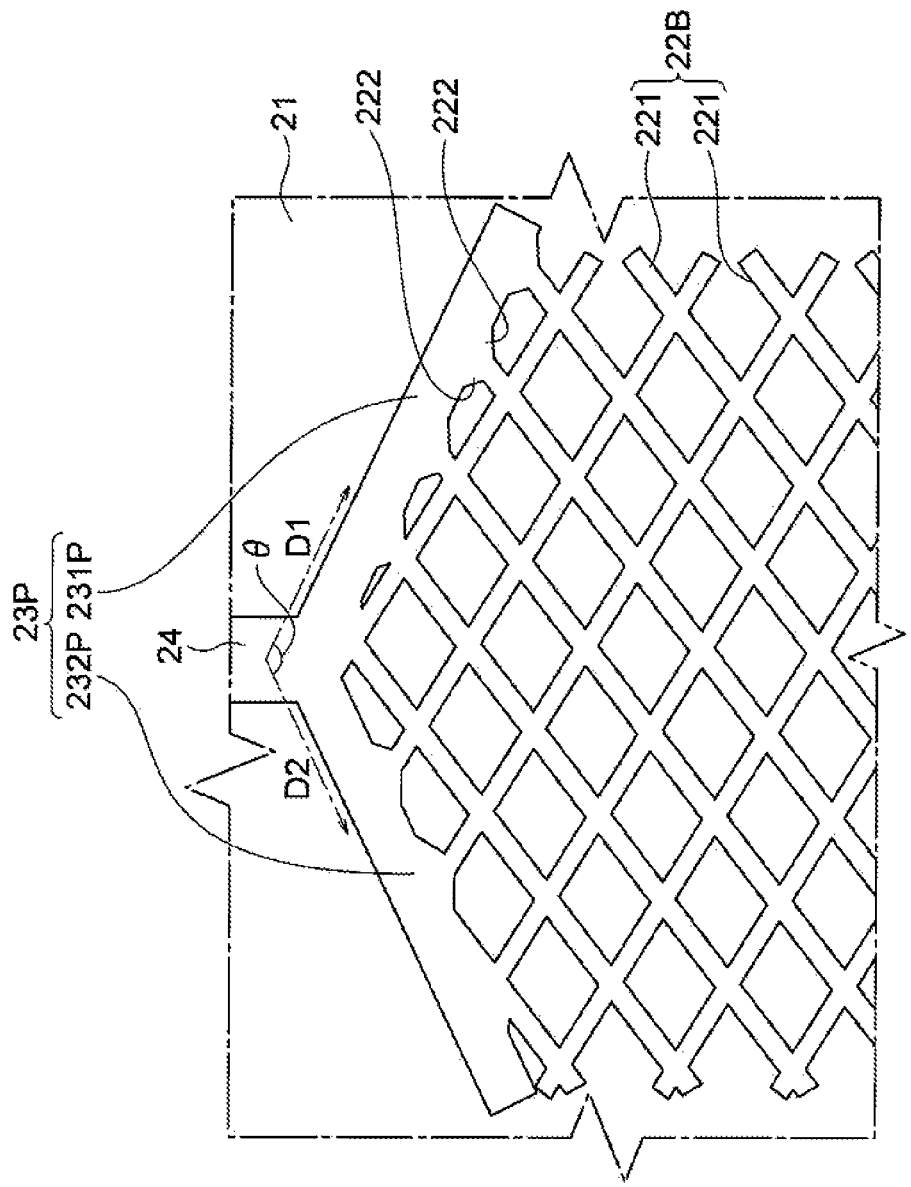
FIG. 18 is a plan view illustrating a modified example of the touch sensor according to the embodiments of the invention.

In this case, as illustrated in FIG. 18, a touch sensor in which a large-width portion 222 which gradually widens according to approaching the first extension outer edge 231P is provided in a connection portion between the first extension outer edge 231P and the conductive wire 221, and a large-width portion 222 which gradually widens according to approaching the second extension outer edge 232P is provided in a connection portion between the second extension outer edge 232P and the conductive wire 221 is produced. Further, a touch sensor may be produced using an intaglio 50B in which a large-width recess 54 is provided in only one of the connection portion between the first extension portion 531P and the linear recess 521 and the connection portion between the second extension portion 532P and the linear recess 521.

When a touch sensor is produced using such an intaglio 50B, at the time of filling of the conductive paste during printing, filling unevenness will not occur in the entire region near the boundary between the outer edge recess 53P and the net-shaped recess 52B. Due to this, in a produced touch sensor, it is possible to suppress the occurrence of a disconnection between the outer edge wire 23B and the conductive wire 221 of the net-shaped electrode 22.

Moreover, in the touch sensor including the outer edge wire 23P and the large-width portion 222, the outer edge wire 23P has two different direction components D1 and D2. Thus, it is possible to suppress a disconnection of the outer edge wire 23P due to bending stress applied to the touch sensor and to improve the durability of the outer edge wire 23P against the bending stress.

The effects of the invention were verified through examples which further substantiate the present invention and comparative examples thereof. The following examples and comparative examples are presented in order to verify the effects of suppressing disconnections of a conductive wire of the touch sensors of the embodiments described above. FIGS. 19(A) to 19(E) are plan views illustrating the settings when producing touch sensors of Examples 5 and 6 and Comparative Examples 7 and 8. In the drawings, the same constituent elements as those of the production apparatus of the embodiment described above are denoted by the same reference numerals.

EXAMPLES

Example 1

In Example 1, as illustrated in FIG. 3, the doctor blade 43 was disposed so as to extend along the Y-axis direction, and the sliding direction of the doctor blade 43 was set to the positive X-axis direction.

A recess pattern including a net-shaped recess and an outer edge recess disposed so as to be adjacent to an upper side of the net-shaped recess was formed on an intaglio. Such a large-width recess as illustrated in FIG. 4 was formed in the connection portion between the outer edge recess and a linear recess that forms the net-shaped recess. In this example, the width "a" of the outer edge recess was set to 100 [μm], the largest width "b" of the linear recess in the portion where the large-width recess was provided was set to 75 [μm], and the width of the linear recess was set to 20 [μm]. In the net-shaped recess of this example, a plurality of linear recesses arranged in parallel were formed so as to cross each other at right angles so that the center-to-center distance of adjacent linear recesses is 1000 [μm].

A doctor blade of which the distal end has a thickness of 100 [μm] was used, and a PET film was used as a substrate. A heat-curable silver (Ag) paste was used as the conductive paste.

In this example, after a print pattern was printed on the substrate using a printer configured in the above-described manner, the substrate was dried (for four minutes at 150[° C.]) in an IR furnace so as to cure the silver (Ag) paste. Then, conductivity between the outer edge wire formed by the outer edge recess and the net-shaped electrode formed by the net-shaped recess was checked. It was determined as "O" (Good) when conductivity was verified, and it was determined as "X" (Poor) when conductivity was not verified (disconnection suppression test 1).

Example 2

In Example 2, a test sample was produced in the same manner as Example 1 except that the largest width "b" of the linear recess in the portion where the large-width recess was provided was set to 50 [μm].

Example 3

In Example 3, a test sample was produced in the same manner as Example 1 except that the width "a" of the outer edge recess was set to 50 [μm] and the largest width "b" of the linear recess in the portion where the large-width recess was provided was set to 50 [μm].

Example 4

In Example 4, a test sample was produced in the same manner as Example 1 except that the width "a" of the outer edge recess was set to 50 [μm] and the largest width "b" of the linear recess in the portion where the large-width recess was provided was set to 30 [μm].

When the disconnection suppression effect of the conductive wires of Examples 1 to 4 was checked, as illustrated in Table 1 below, conductivity between the outer edge wire and the net-shaped electrode was verified for all Examples 1 to 4.

TABLE 1

| | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|
| Width "a" of Outer Edge Recess (=Width "A" of Outer Edge Wire) (μm) | 100 | 100 | 50 | 50 | 150 | 150 | 150 | 100 | 100 | 50 |
| Largest Width "b" of Large-width Recess (=Largest Width "B" of Large-width Portion) (μm) | 75 | 50 | 50 | 30 | 75 | 50 | 20 | 30 | 20 | 20 |
| b/a (=B/A) | 0.75 | 0.50 | 1.00 | 0.60 | 0.50 | 0.33 | 0.13 | 0.30 | 0.20 | 0.40 |
| Conductivity | O | O | O | O | X | X | X | X | X | X |

Example 5

Figure 19:
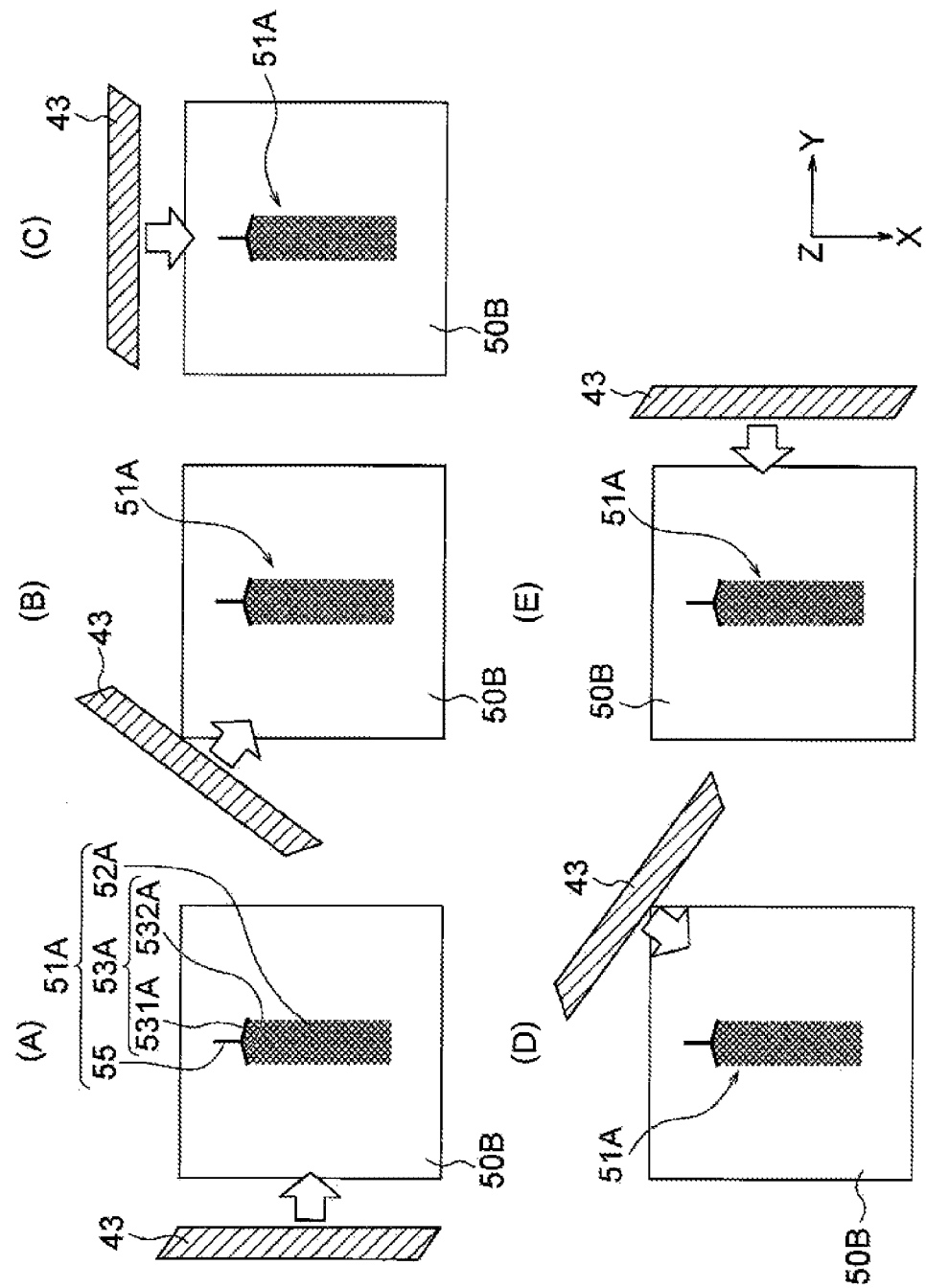
FIGS. 19(A) to 19(E) are plan views illustrating the settings when producing touch sensors of Examples 5 and 6 and Comparative Examples 7 and 8.

In Example 5, a recess pattern 51A was provided on an intaglio 50B, and the recess pattern 51A includes: a net-shaped recess 52A extending toward the lower side in FIG. 19(A); an outer edge recess 53A disposed in an upper portion of the net-shaped recess 52A; and a connection recess 55 extending from substantially the center of the outer edge recess 53A toward the upper side in the drawing. The outer edge recess 53A includes: a first extension portion 531A which extends from the lower end of the connection recess 55 along the down-right direction in the drawing; and a second extension portion 532A which extends from the lower end along the down-left direction in the drawing. In this example, a net-shaped recess 52A was connected between the first and second extension portions 531A and 532A, and the angle θ between the first and second extension portions 531A and 532A was 120[°].

In this example, the line width of the outer edge recess 53A and the line width of the connection recess 55 were set to 100 [μm], and the line width of the linear recess 52A was set to 20 [μm]. In the net-shaped recess 52A of this example, a plurality of linear recesses 52A arranged in parallel were formed so as to cross each other at right angles so that the center-to-center distance of adjacent linear recesses 52A was 1000 [μm].

A doctor blade 43 of which the distal end has a thickness of 100 [μm] was used, and a PET film was used as a substrate 21. A heat-curable silver (Ag) paste was used as the conductive paste. Samples were produced by changing the sliding direction of the doctor blade 43 to 0[°] (the positive Y-axis direction, see FIG. 19(A)), 45[°] (the down-right direction, see FIG. 19(B)), 90[°] (the positive X-axis direction, see FIG. 19(C)), 135[°] (the down-left direction, see FIG. 19(D)), and 180[°] (the negative Y-axis direction, see FIG. 19(E)).

In this example, after the print pattern 49 was printed on the substrate 21 using a printer configured in the above-described manner, the substrate 21 was dried (for four minutes at 150[° C.]) in an IR furnace to cure the silver (Ag) paste. Then, conductivity between the connection wire formed by the connection recess 55 and the net-shaped electrode formed by the net-shaped recess 52A was checked. It was determined as "O" (Good) when conductivity was verified, and it was determined as "X" (Poor) when conductivity was not verified (disconnection suppression test 2).

Example 6

In Example 6, a test sample was produced in the same manner as Example 5 except that the outer edge recess had the same shape as the outer edge recess 53C illustrated in FIG. 15(A). In this case, the angle θ between the first extension portion 533 and the second extension portion 534 was 45[°].

When the disconnection suppression effect of the conductive wires of the produced touch sensors of Examples 5 and 6 was checked, as illustrated in Table 2 below, conductivity between the outer edge wire and the net-shaped electrode was verified at all angles of the sliding direction of the doctor blade 43 for both Examples 5 and 6.

TABLE 2

| Sliding Direction | Example 5 | Example 6 | Comparative Example 7 | Comparative Example 8 |
|---|---|---|---|---|
| 0 [°] | O | O | O | O |
| 45 [°] | O | O | O | O |
| 90 [°] | O | O | X | O |
| 135 [°] | O | O | O | X |
| 180 [°] | O | O | O | O |

Comparative Example 1

In Comparative Example 1, a test sample was produced in the same manner as Example 1 except that the width "a" of the outer edge recess was set to 150 [μm].

Comparative Example 2

In Comparative Example 2, a test sample was produced in the same manner as Example 1 except that the width "a" of the outer edge recess was set to 150 [μm] and the largest width "b" of the linear recess in the portion where the large-width recess was provided was set to 50 [μm].

Comparative Example 3

In Comparative Example 3, a test sample was produced in the same manner as Example 1 except that the width "a" of the outer edge recess was set to 150 [μm] and the largest width "b" of the linear recess in the portion where the large-width recess was provided was set to 20 [μm].

Comparative Example 4

In Comparative Example 4, a test sample was produced in the same manner as Example 1 except that the largest width "b" of the linear recess in the portion where the large-width recess was provided was set to 30 [μm].

Comparative Example 5

In Comparative Example 5, a test sample was produced in the same manner as Example 1 except that the largest width "b" of the linear recess in the portion where the large-width recess was provided was set to 20 [μm].

Comparative Example 6

In Comparative Example 6, a test sample was produced in the same manner as Example 1 except that the width "a" of the outer edge recess was set to 50 [μm] and the largest width "b" of the linear recess in the portion where the large-width recess was provided was set to 20 [μm].

When the disconnection suppression effect for Comparative Examples 1 to 6 was checked, as illustrated in Table 1, conductivity between the outer edge wire and the net-shaped electrode was not verified for all Comparative Examples 1 to 6.

In Examples 1 to 4 in which the touch sensors were produced using the intaglio which had the recess pattern in which the width "a" of the outer edge recess and the largest width "b" of the linear recess in the portion where the large-width recess was provided satisfied Expressions (4) and (5), it was possible to verify conductivity between the outer edge wire and the net-shaped electrode.

In contrast, in Comparative Examples 1 to 6 in which the touch sensors were produced using the intaglio which had the recess pattern in which the width "a" of the outer edge recess and the largest width "b" of the linear recess in the portion where the large-width recess was provided did not satisfy both Expressions (4) and (5), it was not possible to verify conductivity between the outer edge wire and the net-shaped electrode.

This results from the fact that filling unevenness of the conductive paste during printing is likely to occur when the width "a" of the outer edge recess was larger than 100 [μm] (Comparative Examples 1 to 3) or when the largest width "b" of the linear recess in the portion where the large-width recess was provided was smaller than 0.5 of the width "a" of the outer edge recess (Comparative Examples 2 to 6).

Comparative Example 7

In Comparative Example 7, a test sample was produced in the same manner as Example 5 except that the outer edge recess had a straight-line shape having a width of 100 [μm] and extending along the Y-axis direction.

Comparative Example 8

In Comparative Example 8, a test sample was produced in the same manner as Example 5 except that the outer edge recess had such a shape that the first extension portion 533 was omitted from the shape (the outer edge recess 53C illustrated in FIG. 15(A)) of Example 6.

When disconnection suppression test 2 was conducted for Comparative Examples 7 and 8 to check the disconnection suppression effect of the conductive wires of the produced touch sensors, as illustrated in Table 2, conductivity between the outer edge wire and the net-shaped electrode was not verified for the test samples of Comparative Example 7 when the sliding direction of the doctor blade 43 was 90[°]. In the test sample of Comparative Example 8, conductivity between the outer edge wire and the net-shaped electrode was not verified when the sliding direction of the doctor blade 43 was 135[°].

In Examples 5 and 6 in which the touch sensors were produced using the intaglio which had the outer edge recess having such a shape that had at least two different direction components, it was possible to verify conductivity between the outer edge wire and the net-shaped electrode regardless of the sliding direction of the doctor blade 43.

In contrast, in Comparative Examples 7 and 8 in which the touch sensors were produced using the intaglio which had the outer edge recess having such a shape that extends in one direction only, it was not always possible to verify conductivity between the outer edge wire and the net-shaped electrode depending on the sliding direction of the doctor blade 43.

This results from the fact that filling unevenness of the conductive paste during printing is likely to occur when the extension direction of the doctor blade 43 is approximately the same as the extension directions of all outer edge recesses.

EXPLANATIONS OF LETTERS OR NUMERALS

1, 1B . . . Touch key
2, 2B . . . Touch sensor
21 . . . Substrate
22, 22B . . . Net-shaped electrode
221 . . . Conductive wire
222 . . . Large-width portion
23, 23C to 23F, 23P . . . Outer edge wire
231, 231C to 231E, 231P . . . First extension outer edge
231, 232C to 232E, 232P . . . Second extension outer edge
233E . . . Third extension outer edge
4, 4B . . . Gravure offset printing machine
43 . . . Doctor blade
45 . . . Transfer roller
47 . . . Conductive paste
51, 51P . . . Recess pattern
52, 52B . . . Net-shaped recess
521 . . . Linear recess
53, 53P . . . Outer edge recess
531P . . . First extension portion
532P . . . Second extension portion
54 . . . Large-width recess

The invention claimed is:
1. A touch sensor comprising:
a substrate;
a net-shaped electrode which is provided on the substrate and includes conductive wires arranged in a net form; and
an outer edge wire which is provided in at least a part of an outer edge of the net-shaped electrode and is integrally formed with the net-shaped electrode, wherein
the conductive wire includes a large-width portion which is provided in at least one of lateral parts of a connection portion and gradually widens according to approaching the outer edge wire, the conductive portion being a portion of the conductive wire which is connected to the outer edge wire, and
Expressions (1) and (2) are satisfied:

$$A \leq 100 \, [\mu m] \quad (1)$$

$$B/A \geq \tfrac{1}{2} \quad (2)$$

in Expressions (1) and (2), "A" is a width of the outer edge wire, and "B" is a largest width of the conductive wire in a portion where the large-width portion is provided.
2. The touch sensor according to claim 1, wherein Expression (3) is satisfied:

$$C/A \geq \tfrac{1}{20} \quad (3)$$

in Expression (3), "C" is a width of the conductive wire excluding the large-width portion.
3. The touch sensor according to claim 1, wherein the outer edge wire includes:
a first extension wire portion which extends along a first direction and is connected to the net-shaped electrode; and
a second extension wire portion which extends from the first extension wire portion along a second direction and is connected to the net-shaped electrode, and
the first and second directions are directions on different straight lines.
4. The touch sensor according to claim 3, wherein Expression (7) is satisfied:

$$15[°] < \theta < 165[°] \quad (7)$$

in Expression (7), "θ" is an angle between the first and second directions on a side where the net-shaped electrode is connected.
5. The touch sensor according to claim 1, wherein the outer edge wire includes a curved portion.
6. A production method for a touch sensor, comprising:
filling a conductive paste in a recess pattern formed in an intaglio and moving a doctor blade so as to slide with respect to the intaglio; and
transferring the conductive paste to a transfer object, wherein
the recess pattern includes:
a net-shaped recess which includes linear recesses arranged in a net form; and
an outer edge recess which is provided to be continuous to at least a part of an outer edge of the net-shaped recess,
the linear recess includes a large-width recess which is provided in at least one of lateral parts of a connection portion and gradually widens according to approaching the outer edge recess, the connection portion being a portion of the linear recess which is connected to the outer edge recess, and
Expressions (4) and (5) are satisfied:

$$a \leq 100 \, [\mu m] \quad (4)$$

$$b/a \geq \tfrac{1}{2} \quad (5)$$

in Expressions (4) and (5), "a" is a width of the outer edge recess, and "b" is a largest width of the linear recess in a portion where the large-width recess is provided.
7. The production method for the touch sensor according to claim 6, wherein
Expression (6) is satisfied:

$$c/a \geq \tfrac{1}{20} \quad (6)$$

in Expression (6), "c" is a width of the linear recess excluding the large-width recess.
8. The production method for the touch sensor according to claim 6, wherein
the outer edge recess includes:
a first extension portion which extends along a first direction and is connected to the net-shaped recess; and
a second extension portion which extends from the first extension portion along a second direction and is connected to the net-shaped recess, and
the first and second directions are directions on different straight lines.
9. The production method for the touch sensor according to claim 8, wherein
Expression (8) is satisfied:

$$15[°] < \theta < 165[°] \tag{8}$$

in Expression (8), "$\theta$" is an angle between the first and second directions on a side where the net-shaped electrode is connected.

10. The production method for the touch sensor according to claim 6, wherein
the outer edge recess includes a curved portion.

* * * * *